US010977878B2

(12) United States Patent
Morishima

(10) Patent No.: US 10,977,878 B2
(45) Date of Patent: Apr. 13, 2021

(54) DRIVING SKILL EVALUATION METHOD, DRIVING SKILL EVALUATION PROGRAM, DRIVING SKILL EVALUATION APPARATUS, AND VEHICLE PROVIDED THEREWITH

(71) Applicant: YAMAHA HATSUDOKI KABUSHIKI KAISHA, Iwata (JP)

(72) Inventor: Keisuke Morishima, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 1120 days.

(21) Appl. No.: 15/026,712

(22) PCT Filed: Sep. 25, 2014

(86) PCT No.: PCT/JP2014/075525
§ 371 (c)(1),
(2) Date: Apr. 1, 2016

(87) PCT Pub. No.: WO2015/050037
PCT Pub. Date: Apr. 9, 2015

(65) Prior Publication Data
US 2016/0232722 A1 Aug. 11, 2016

(30) Foreign Application Priority Data
Oct. 2, 2013 (JP) .............................. JP2013-207055

(51) Int. Cl.
*G07C 5/06* (2006.01)
*B62K 11/00* (2006.01)
(Continued)

(52) U.S. Cl.
CPC ............... *G07C 5/06* (2013.01); *B60W 40/09* (2013.01); *B62H 7/00* (2013.01); *B62K 11/00* (2013.01); *G09B 19/167* (2013.01)

(58) Field of Classification Search
CPC ........... G07C 5/06; B60W 40/09; B62H 7/00; B62K 19/167; G09B 19/167
(Continued)

(56) References Cited

U.S. PATENT DOCUMENTS

2007/0129861 A1   6/2007 Hashiba et al.
2007/0290867 A1*  12/2007 Kuramori ................ B60Q 9/00
                                                340/576
(Continued)

FOREIGN PATENT DOCUMENTS

CN      101853585 A      10/2010
EP      0 460 581 A2     12/1991
(Continued)

OTHER PUBLICATIONS

Official Communication issued in International Patent Application No. PCT/JP2014/075525, dated Dec. 22, 2014.

*Primary Examiner* — Robert P Bullington
(74) *Attorney, Agent, or Firm* — Keating and Bennett, LLP

(57) ABSTRACT

A method of evaluating a driving skill executed by a computer includes a skill evaluation step of evaluating a driver's driving skill based on a detection value of a vehicle state, a component separating step of separating the detection value of the vehicle state into a driver's operation component reflecting a driver's motion and a non-driver's operation component without reflecting the driver's motion, and a skill evaluation modifying step of correcting or abandoning evaluation of the driving skill based on at least one of an amount of the driver's operation component and an amount of the non-driver's operation component.

11 Claims, 13 Drawing Sheets

(51) Int. Cl.
  *B62H 7/00*   (2006.01)
  *B60W 40/09*  (2012.01)
  *G09B 19/16*  (2006.01)

(58) Field of Classification Search
  USPC .......................................................... 434/61
  See application file for complete search history.

(56) References Cited

U.S. PATENT DOCUMENTS

| | | | |
|---|---|---|---|
| 2010/0076649 A1* | 3/2010 | Iyoda | B60G 17/0162 |
| | | | 701/38 |
| 2010/0209889 A1* | 8/2010 | Huang | B60W 40/09 |
| | | | 434/65 |
| 2010/0250046 A1 | 9/2010 | Miura | |
| 2012/0259479 A1 | 10/2012 | Yoneta et al. | |

FOREIGN PATENT DOCUMENTS

| | | |
|---|---|---|
| EP | 2 161 641 A1 | 3/2010 |
| EP | 2 517 952 A1 | 10/2012 |
| EP | 2 799 323 A1 | 11/2014 |
| JP | 2002-154346 A | 5/2002 |
| JP | 3516986 B2 | 4/2004 |
| JP | 2005-077788 A | 3/2005 |
| JP | 2006-232172 A | 9/2006 |
| WO | 2011/077638 A1 | 6/2011 |
| WO | 2013/099245 A1 | 7/2013 |

* cited by examiner

DRIVING SKILL EVALUATION METHOD, DRIVING SKILL EVALUATION PROGRAM, DRIVING SKILL EVALUATION APPARATUS, AND VEHICLE PROVIDED THEREWITH

BACKGROUND OF THE INVENTION

1. Field of the Invention

The present invention relates to a driving skill evaluation method, a driving skill evaluation program, a driving skill evaluation apparatus that evaluates vehicle driving skills, and a vehicle provided therewith.

2. Description of the Related Art

A currently-used driving skill evaluation apparatus evaluates a driver's driving skills for driving a two-wheeled vehicle or a four-wheeled vehicle. For a four-wheeled vehicle, the driver's driving skills are determined from a steering angle. For a two-wheeled vehicle, the driving skills are determined from detection values obtained by detecting a variation in yaw direction, roll direction, pitch direction, or caster angle. The driving skills evaluated with the driving skill evaluation apparatus are displayed to the driver via a monitor. Alternatively, the driving skills are notified to the driver as voice information.

International Publication No. WO 2011/077638 discloses a rider characteristic determining apparatus that detects a variation in yaw direction, roll direction, pitch direction, or caster angle. Then, a vehicle stability characteristic and a turning characteristic of a rider are determined from detection values of the above, and a monitor displays the determination results.

JP Patent No. 3516986 discloses a driving skill estimating apparatus that determines an actual track of a vehicle from a vehicular motion quantity, and determines a target track from a driver's operation quantity. Then a driver's skill is estimated based on an integral value of a deviation between the actual track and the target track.

In the driving skill determining apparatus disclosed each of in International Publication No. WO 2011/077638 and JP Patent No. 3516986, the detection values for the state quantity of the vehicle contains components that are not derived from the driver's motion. The driving skill determining apparatus in International Publication No. WO 2011/077638 and JP Patent No. 3516986 evaluates the driver's driving skills while the components not derived from the driver's motion are contained. This may degrade the evaluation accuracy.

SUMMARY OF THE INVENTION

In view of the state of the art described above, preferred embodiments of the present invention provide a driving skill evaluation method, a non-transitory computer-readable medium including a driving skill evaluation program, a driving skill evaluation apparatus, and a vehicle provided therewith that reduce the influence of components that are not derived from a driver's motion.

A first preferred embodiment of the present invention provides a method of evaluating a driving skill. The method includes a skill evaluation step of evaluating a driver's driving skill based on a detection value of a vehicle state; a component separating step of separating the detection value of the vehicle state into a driver's operation component reflecting a driver's motion and a non-driver's operation component without reflecting the driver's motion; and a skill evaluation modifying step of correcting or abandoning evaluation of the driving skill based on at least one of an amount of the driver's operation component and an amount of the non-driver's operation component.

With the method of evaluating the driving skill according to the first preferred embodiment, the detection value of the vehicle state is separated into the driver's operation component reflecting the driver's motion and the non-driver's operation component without reflecting the driver's motion. Moreover, at least one of the amount of the driver's operation component and the amount of the non-driver's operation component is used, so that a mixing ratio of noise is able to be evaluated. Consequently, correction or abandonment of the evaluation for the driving skill based on at least one of the amount of the driver's operation component and the amount of the non-driver's operation component modifies the evaluation of the driving skill depending on the mixing ratio of noise. Accordingly, the driver's vehicle driving skill is determined accurately even when the detection value of the vehicle state contains many components that are not derived from the driver's motion.

It is preferred that the method further includes a non-driver's operation component amount detecting step of detecting the amount of the non-driver's operation component, and an all component amount detecting step of detecting an amount of all components in the detection value of the vehicle state. In the component separating step, a high frequency component higher than a threshold frequency set in advance is extracted from the detection value of the vehicle state as the non-driver's operation component. In the skill evaluation modifying step, the evaluation of the driving skill is corrected or abandoned based on a ratio of the amount of the non-driver's operation component and the amount of all components in the detection value.

The component that is not derived from the driver's motion and the component that is derived from the driver's motion are separated from each other based on a difference in their frequency band. This achieves an accurate detection of the component that is not derived from the driver's motion. Moreover, using a ratio of components in all frequency bands and the component not derived from the driver's motion yields detection of the component not derived from the driver's motion regardless of a range of the driver's motion.

It is also preferred that the method further includes a driver's operation component amount detecting step of detecting the amount of the driver's operation component. In the component separating step, a frequency component equal to or lower than a threshold frequency set in advance is extracted from the detection value of the vehicle state as the driver's operation component. In the skill evaluation modifying step, the evaluation of the driving skill is corrected or abandoned based on the amount of the driver's operation component.

The component that is not derived from the driver's motion and the component that is derived from the driver's motion are separated from each other based on a difference in their frequency band. Consequently, a component to which the driver's motion has a relatively large contribution is retrieved as the component that is derived from the driver's motion. The influence of the component that is not derived from the driver's motion for the detection result of the vehicle state depends on the amount of the driver's operation component. The component whose frequency is equal to or lower than the threshold frequency is used as a reference, so that an accurate detection of a condition in which the component that is not derived from the driver's motion defines a majority of the components, is obtained.

A second preferred embodiment of the present invention provides a non-transitory computer-readable medium including a driving skill evaluation program that causes a computer to function as a skill evaluation unit that evaluates a driver's driving skill based on a detection value of a vehicle state; a component separating unit that separates the detection value of the vehicle state into a driver's operation component reflecting a driver's motion and a non-driver's operation component without reflecting the driver's motion; and a skill evaluation modifying unit that corrects or abandons evaluation of the driving skill based on at least one of an amount of the driver's operation component and an amount of the non-driver's operation component.

With the non-transitory computer-readable medium including the driving skill evaluation program according to the second preferred embodiment of the present invention, the detection value of the vehicle state is separated into the driver's operation component reflecting the driver's motion and the non-driver's operation component without reflecting the driver's motion. At least one of the amount of the driver's operation component and the amount of the non-driver's operation component is used, so that a mixing ratio of noises is evaluated. Consequently, correction or abandonment of the evaluation of the driving skill based on at least one of the driver's operation component and the non-driver's operation component modifies the evaluation of the driving skill depending on the mixing ratio of noise. Accordingly, the driver's vehicle driving skill is determined accurately even when the detection value of the vehicle state contains many components that are not derived from the driver's motion.

It is also preferred that the computer also functions as a non-driver's operation component amount detector that detects the amount of the non-driver's operation component, and an all component amount detector that detects an amount of all components in the detection value of the vehicle state. It is also preferred that the component separating unit extracts a high frequency component higher than a threshold frequency set in advance from the detection value of the vehicle state as the non-driver's operation component, and the skill evaluation modifying unit corrects or abandons the evaluation of the driving skill based on a ratio of the amount of the non-driver's operation component and the amount of all components in the detection value.

The component that is not derived from the driver's motion and the component that is derived from the driver's motion are separated from each other based on a difference in their frequency band. This achieves an accurate detection of the component that is not derived from the driver's motion. Moreover, using a ratio of components in all frequency bands and the component not derived from the driver's motion yields detection of the component not derived from the driver's motion regardless of a range of the driver's motion.

It is also preferred that the computer functions as a driver's operation component amount detector that detects the amount of the driver's operation component. It is also preferred that the component separating unit extracts a frequency component equal to or lower than a threshold frequency set in advance from the detection value of the vehicle state as the driver's operation component, and the skill evaluation modifying unit corrects or abandons the evaluation of the driving skill based on the amount of the driver's operation component.

The component that is not derived from the driver's motion and the component that is derived from the driver's motion are separated from each other based on a difference in their frequency band. Consequently, a component to which the driver's motion has a relatively large contribution is retrieved as the component that is derived from the driver's motion. The influence of the component that is not derived from the driver's motion for the detection result of the vehicle state depends on the amount of the driver's operation component. The component whose frequency is equal to or lower than the threshold frequency is used as a reference, so that an accurate detection is obtained of a condition in which the component that is not derived from the driver's motion defines a majority of the components.

A third preferred embodiment of the present invention provides a driving skill evaluation apparatus. The driving skill evaluation apparatus includes a controller configured or programmed to include a skill evaluation unit that evaluates a driver's driving skill based on a detection value of a vehicle state; a component separating unit that separates the detection value of the vehicle state into a driver's operation component reflecting a driver's motion and a non-driver's operation component without reflecting the driver's motion; and a skill evaluation modifying unit that corrects or abandons evaluation of the driving skill based on at least one of an amount of the driver's operation component and an amount of the non-driver's operation component.

With the driving skill evaluation apparatus according to the third preferred embodiment of the present invention, the detection value of the vehicle state is separated into the driver's operation component reflecting the driver's motion and the non-driver's operation component without reflecting the driver's motion. At least one of the amount of the driver's operation component and the amount of the non-driver's operation component is used, so that a mixing ratio of noise is evaluated. Consequently, correction or abandonment of the evaluation of the driving skill based on at least one of the driver's operation component and the non-driver's operation component modifies the evaluation of the driving skill depending on the mixing ratio of noise. Accordingly, the driver's vehicle driving skill is determined accurately even when the detection value of the vehicle state contains many components that are not derived from the driver's motion.

It is also preferred that the controller of the driving skill evaluation apparatus is further configured or programmed to include a non-driver's operation component amount detector that detects the amount of the non-driver's operation component, and an all component amount detector that detects an amount of all components in the detection value of the vehicle state. It is also preferred that the component separating unit extracts a high frequency component higher than a threshold frequency set in advance from the detection value of the vehicle state as the non-driver's operation component, and the skill evaluation modifying unit corrects or abandons the evaluation of the driving skill based on a ratio of the amount of the non-driver's operation component and the amount of all components in the detection value.

The component that is not derived from the driver's motion and the component that is derived from the driver's motion are separated from each other based on a difference in their frequency band. This achieves an accurate detection of the component that is not derived from the driver's motion. Moreover, using a ratio of components in all frequency bands and the component not derived from the driver's motion yields detection of the component not derived from the driver's motion regardless of a range of the driver's motion.

It is also preferred that the controller of the driving skill evaluation apparatus is further configured or programmed to include a driver's operation component amount detector that detects the amount of the driver's operation component, wherein the component separating unit extracts a frequency component equal to or lower than a threshold frequency set in advance from the detection value of the vehicle state as the driver's operation component, and the skill evaluation modifying unit corrects or abandons the evaluation of the driving skill based on the amount of the driver's operation component.

The component that is not derived from the driver's motion and the component that is derived from the driver's motion are separated from each other based on a difference in their frequency band. Consequently, a component to which the driver's motion has a relatively large contribution is retrieved as the component that is derived from the driver's motion. The influence of the component that is not derived from the driver's motion for the detection result of the vehicle state depends on the amount of the driver's operation component. The component whose frequency is equal to or lower than the threshold frequency is used as a reference, so that an accurate detection is obtained of a condition in which the component that is not derived from the driver's motion defines a majority of the components.

It is also preferred that the controller of the driving skill evaluation apparatus is further configured or programmed to include an information notification unit that notifies a driver of information on the evaluation of the driving skill that is modified with the skill evaluation modifying unit. The driver is able to be notified directly of the evaluation of the driving skill from the information notification unit.

It is also preferred that a vehicle according to a preferred embodiment of the present invention is provided with the driving skill evaluation apparatus. Since the vehicle is provided with the driving skill evaluation apparatus, the driver who drives the vehicle is able to understand his/her own driving evaluation.

The preferred embodiments of the present invention provide a method of evaluating the driving skill, a non-transitory computer-readable medium including a driving skill evaluation program, a driving skill evaluation apparatus, and a vehicle provided therewith that reduce the influence of components that are not derived from a driver's motion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The following preferred embodiments of the present invention with be described with reference to the drawings. In the first preferred embodiment of the present invention, a two-wheeled motor vehicle will be described as one example of a vehicle. Hereafter, the terms front and rear as well as right and left are relative to a direction in which the two-wheeled motor vehicle travels.

Figure 1:
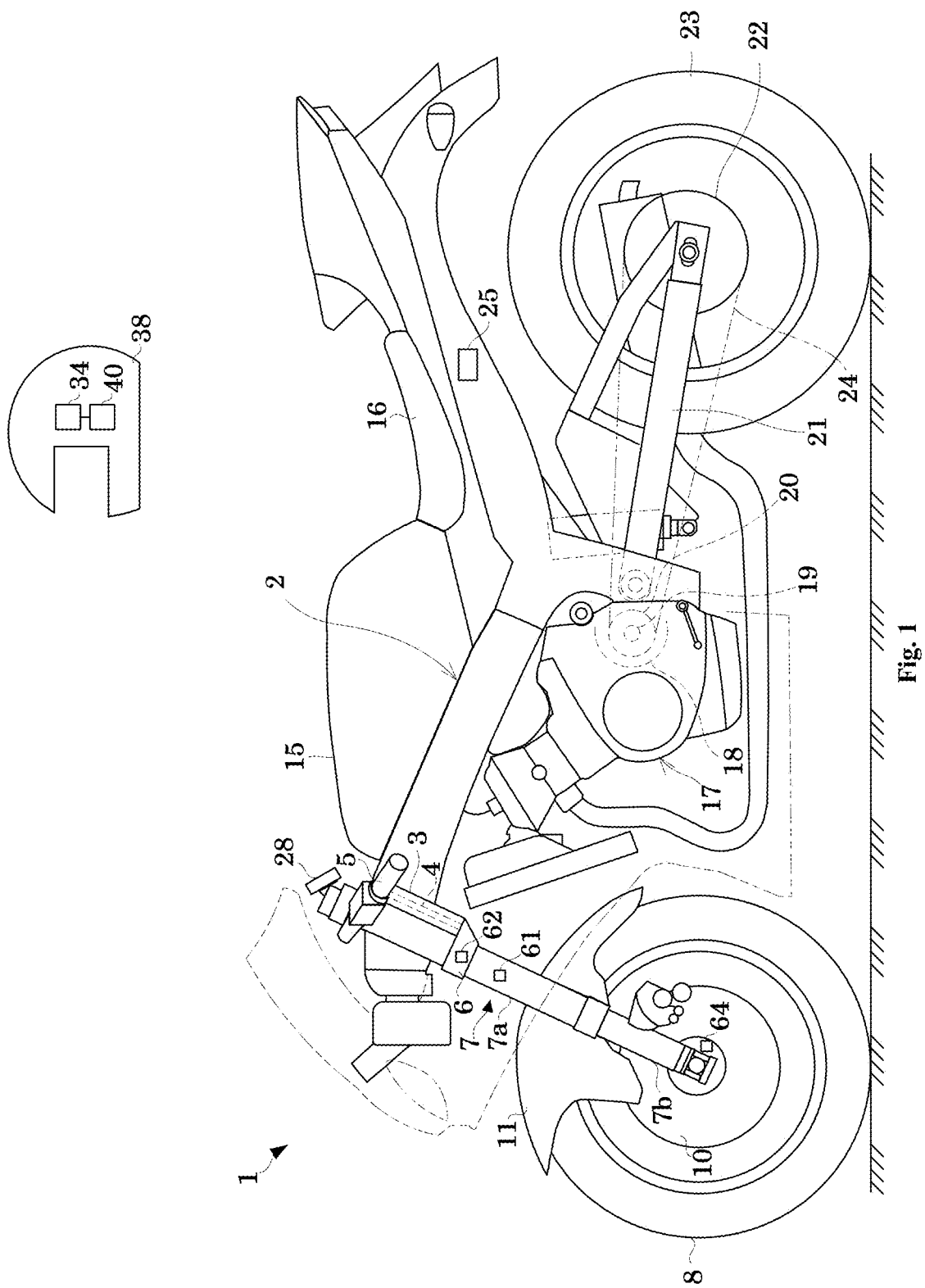
FIG. 1 is a side view illustrating an outline construction of a two-wheeled motor vehicle according to a first preferred embodiment of the present invention.

FIG. 1 is a side view illustrating an outline construction of the two-wheeled motor vehicle according to the first preferred embodiment. The two-wheeled motor vehicle 1 includes a main frame 2. The main frame 2 includes a head tube 3 provided on a front upper end thereof. A steering shaft 4 is inserted into the head tube 3. The steering shaft 4 includes an upper end on which an upper bracket (not shown) is fixed, and a lower end on which a lower bracket 6 is fixed. Both of the brackets retain paired right and left front forks 7 that are extendible and contractible. A handle 5 is connected to the upper bracket. The handle 5 includes a throttle operating unit and a brake lever (not shown) on the right thereof, and a clutch lever (not shown) on the left thereof.

Rotating the handle 5 causes the front forks 7 to swing around the steering shaft 4. The front forks 7 each include an upper outer tube 7a and a lower inner tube 7b retained in the upper outer tube 7a in an extendible and contractible manner. A front wheel 8 is rotatably attached to a lower end of the inner tube 7b. Extension and contraction of the front forks 7 absorb vibrations from the front wheel 8. A brake 10 is attached between the inner tube 7b and the front wheel 8 to brake rotation of the front wheel 8 via operation of the brake lever. A front fender 11 is retained on the inner tube 7b so as to move upward/downward along with the front wheel 8.

A fuel tank 15 and a sheet 16 are retained on an upper side of the main frame 2 in a back-and-forth relationship. An engine 17 and a transmission 18 are retained on the main frame 2 below the fuel tank 15. The transmission 18 includes a drive shaft 19 that outputs power generated in the engine 17. The drive shaft 19 is connected to a drive sprocket 20.

A swing arm 21 is swingingly retained on a lower end of the main frame 2. A driven sprocket 22 and a rear wheel 23 are rotatably retained on a rear end of the swing arm 21. A chain 24 is suspended between the drive sprocket 20 and the driven sprocket 22. The power generated in the engine 17 is transmitted to the rear wheel 23 via the transmission 18, the drive shaft 19, the drive sprocket 20, the chain 24, and the driven sprocket 22. An ECU (Electronic Control Unit) 25 is disposed below the sheet 16 and is configured or programmed to control operation of various units of the two-wheeled motor vehicle 1.

Figure 2:
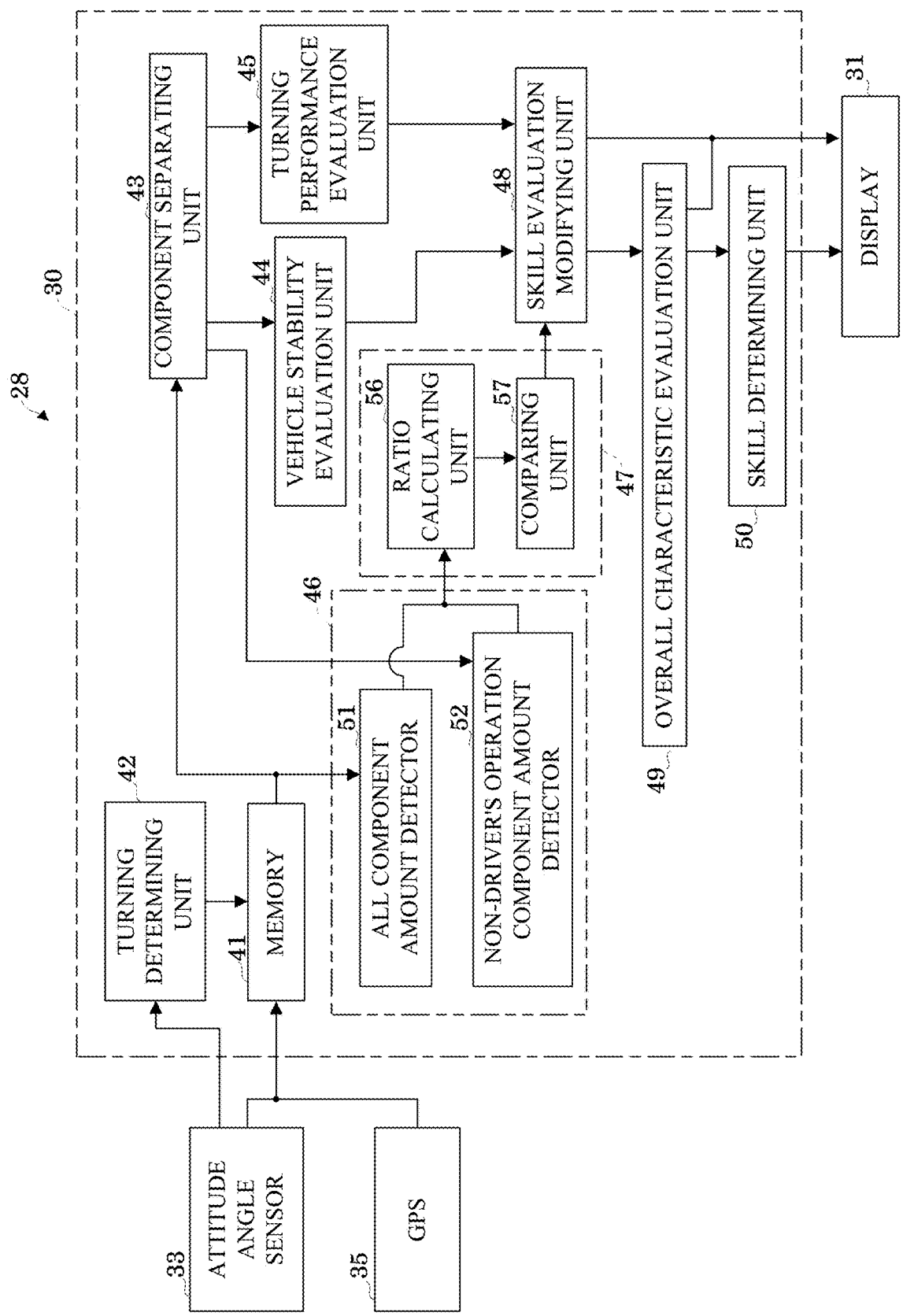
FIG. 2 is a functional block diagram illustrating a driving skill evaluation apparatus according to the first preferred embodiment of the present invention.
Figure 3:
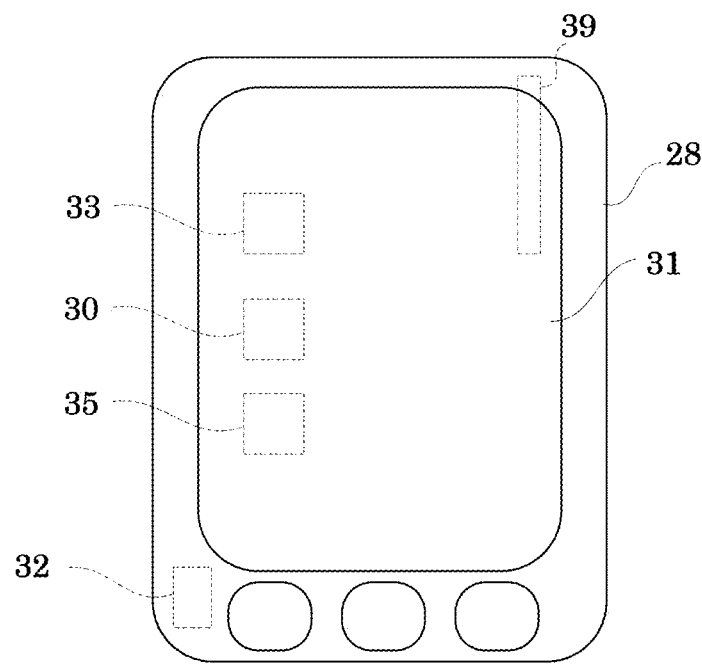
FIG. 3 is a mobile terminal as one example of the driving skill evaluation apparatus.

The following describes a driving skill evaluation apparatus 28 with reference to FIGS. 1 to 3. FIG. 2 is a functional block diagram illustrating a driving skill evaluation apparatus. FIG. 3 is a mobile terminal as one example of the driving skill evaluation apparatus. The driving skill evaluation apparatus 28 includes a skill determining controller 30, a display 31, an attitude angle sensor 33, and a GPS (Global Positioning System) 35. In the first preferred embodiment, the mobile terminal such as a smartphone is preferably used as the driving skill evaluation apparatus 28, for example. The smartphone integrally includes a CPU as the skill determining controller 30, a gyro sensor as the attitude angle sensor 33, the GPS 35, and the display 31. Accordingly, the smartphone is able to function as the driving skill evaluation apparatus 28. The mobile terminal further includes a radio communication device 39 that performs data communication with another type of mobile terminal and a host computer. The driving skill evaluation apparatus 28 is disposed above the handle 5.

The attitude angle sensor 33 detects a vehicle state quantity of the two-wheeled motor vehicle 1. Examples of the attitude angle sensor 33 include a triaxial gyroscope. The mobile terminal is attached to the two-wheeled motor vehicle 1, so that the attitude angle sensor 33 embedded in the mobile terminal detects angular rates and angles of the two-wheeled motor vehicle 1 in three triaxial directions, i.e., yaw, roll, and pitch directions. That is, a yaw rate, a yaw angle, a roll rate, a roll angle, a pitch rate, and a pitch angle of the two-wheeled motor vehicle 1 are detected. The attitude angle sensor 33 corresponds to the vehicle state detector in a preferred embodiment of the present invention.

When a driver operates a handle 5 of the two-wheeled motor vehicle 1 upon turning in a curve, the yaw angle and the yaw rate of the two-wheeled motor vehicle 1 each change. When the driver inclines the vehicle body of the two-wheeled motor vehicle 1 toward the center of the curve, the roll angle and the roll rate of the two-wheeled motor vehicle 1 each change. When the driver operates the brake lever before or during travelling the curve to decrease a rate of the two-wheeled motor vehicle 1, the front forks 7 each contract. Such contraction of the front forks 7 changes the pitch angle and the pitch rate of the two-wheeled motor vehicle 1.

The yaw angle, the yaw rate, the roll angle, the roll rate, the pitch angle, and the pitch rate are referred to as a vehicle state quantity. Another element may be contained in the vehicle state quantity to be detected, or any of the above may be removed. Moreover, a driver's operation amount such as a throttle operating amount and a brake operating amount may be included as the vehicle state quantity.

The GPS (Global Positioning System) 35 detects positional information of the two-wheeled motor vehicle 1 and information on the current time. A memory 41 stores the detected position information and the time information in association with the vehicle state quantity.

The skill determining controller 30 determines the driving skill during turning by the driver. The skill determining controller 30 is configured or programmed to include the memory 41, a turning determining unit 42, a component separating unit 43, a vehicle stability evaluation unit 44, a turning performance evaluation unit 45, a component amount detector 46, a modification unit 47, a skill evaluation modifying unit 48, an overall characteristic evaluation unit 49, and a skill determining unit 50. The skill determining controller 30 may be configured or programmed in the CPU and the memory embedded in the mobile terminal.

The turning determining unit 42 determines whether or not the two-wheeled motor vehicle 1 performs a turning motion. The turning motion corresponds to a case in which the yaw rate of the two-wheeled motor vehicle 1 has a constant value or more and elapses for a given time or more. If the above condition is not satisfied, the turning determining unit 42 determines that the two-wheeled motor vehicle 1 does not perform the turning motion.

Figure 4:
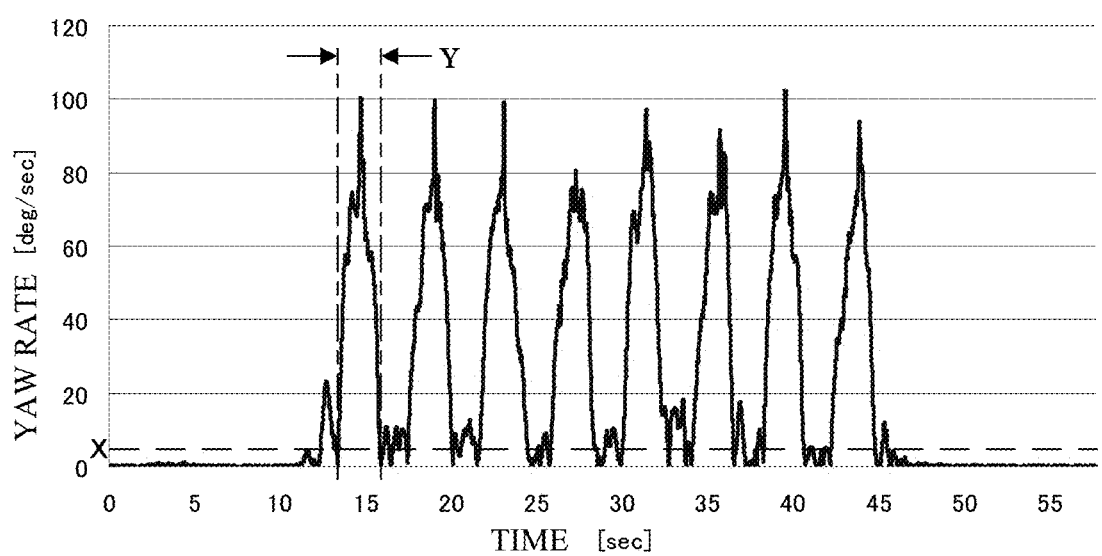
FIG. 4 illustrates a turning determination.

Reference is now made to FIG. 4. FIG. 4 illustrates determination of the turning motion by the turning determining unit 42. The turning determining unit 42 determines a turning motion interval Y from absolute values of the detection values for the yaw rate received from the attitude angle sensor 33. That is, the turning determining unit 42 determines an interval as the turning motion interval Y. Here, the interval is between when the absolute value of the detection value for the yaw rate of the two-wheeled motor vehicle 1 exceeds a threshold X and when the absolute value falls below the threshold X again, and the interval has a time duration of more than the minimum time duration $Y_{min}$.

If the interval between when the absolute value of the detection value for the yaw rate of the two-wheeled motor vehicle 1 exceeds the threshold X and when the absolute value falls below the threshold X again is smaller than the minimum time duration $Y_{min}$, the turning determining unit 42 does not determine the interval as the turning motion interval. The threshold X may be set appropriately depending on the type of the two-wheeled motor vehicle 1. The turning motion interval Y is determined with a method using the yaw rate. However, the turning motion interval Y may be determined using the yaw angle or with another method using data from the GPS. When the turning motion interval Y is determined using the yaw angle, data on the angle is converted into data on the yaw rate through time differential, and thereafter, the turning motion interval Y is determined in the above manner.

The component separating unit 43 preferably includes a low-pass filter, a band-pass filter, and a high-pass filter. When the turning determining unit 42 determines the turning motion interval Y, the detection values of the vehicle state quantity stored in the memory 41 during the turning motion interval Y are outputted to the component separating unit 43. The detection values transmitted to the component separating unit 43 are subjected to filtering via the low-pass filter, the band-pass filter, and the high-pass filter. Examples of the vehicle state quantity whose components are separable by the component separating unit 43 include the yaw rate, the yaw angle, the roll rate, the roll angle, the pitch rate, and the pitch angle. In the present preferred embodiment, component separation of the roll rate by filtering has been described as one example.

Data on all frequency bands of the roll rate outputted to the component separating unit 43 is subjected to filtering with the low-pass filter, the band-pass filter, and the high-pass filter. With the low-pass filter, a frequency component of a preset threshold frequency Fc1 or more is removed. Consequently, a low frequency component is outputted from the low-pass filter. With the band-pass filter, a frequency component of less than the threshold frequency Fc1 is removed, and a frequency component of more than a threshold frequency Fc2 is separated. Accordingly, a first high frequency component of the threshold frequency Fc1 or more and the threshold frequency Fc2 or less is outputted from the band-pass filter. With the high-pass filter, a frequency component of the threshold frequency Fc2 or less is removed. Accordingly, a second high frequency component of more than the threshold frequency Fc2 is outputted from the high-pass filter.

The filtering is performed on the time series data of the detection values stored in the memory 41 with the low-pass filter, the band-pass filter, and the high-pass filter, so that the detection values are separated into the low frequency component, the first high frequency component, and the second high frequency component. The threshold frequency Fc1 may be set depending on the performance to be determined. For instance, the threshold frequency Fc1 may be set to determine a driver's performance in such a way that a difference in driving skill thereof between a beginner and an expert becomes the maximum. Note that the threshold frequency Fc2 should always preferably be higher than the threshold frequency Fc1.

The low and the first high frequency components are each a driver's operation component reflecting the driver's motion. The second high frequency component is a non-driver's operation component without reflecting the driver's motion. Vibration noise of the vehicle caused by engine vibration and sensor noise of the attitude angle sensor 33 reflect the data on all frequency bands. The vehicle vibration noise or the sensor noise contained in the detection values of the vehicle state quantity largely influences the amount of the non-driver's operation component. That is, the amount of the non-driver's operation component directly reflects an amount of noise. Then, the amount of the non-driver's operation component is usable as a reference of a mixing ratio of the noise component relative to the detection values of the vehicle state quantity. The component separating unit 43 allows extraction of the non-driver's operation component with the high-pass filter.

Figure 5:
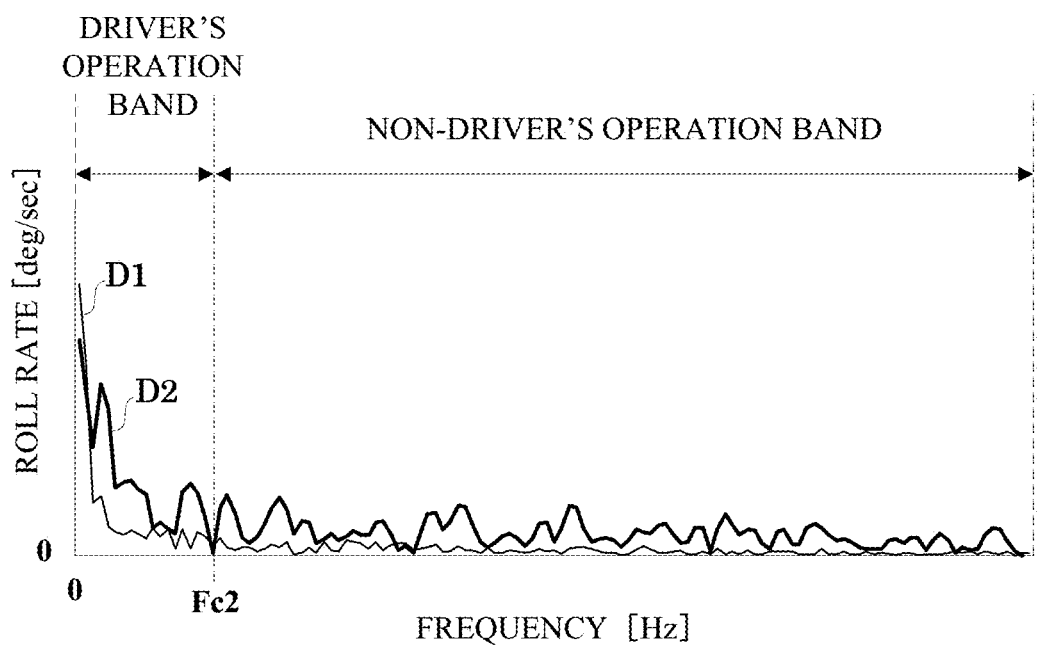
FIG. 5 illustrates a relationship between a detection value of a roll rate and a frequency.

Reference is made to FIG. 5. FIG. 5 illustrates a relationship between a detection value of the roll rate and a frequency. FIG. 5 is a frequency spectrum for the detection value of the roll rate at a given turning interval. The detection value of the roll rate contains a component that is not derived from the driver's motion. At a detection value D1 detected by the attitude angle sensor disposed in such away not to be influenced by the vehicle vibration, a driver's operation band dominates a significant portion of all frequency bands, and high frequency band components higher than the threshold frequency Fc2 are less. In contrast to this, a detection value D2 detected by the attitude angle sensor disposed at a position easily influenced by the vehicle vibration is broadly influenced throughout all frequency bands. That is, noise influences both the band of the driver's operation component and the band of the non-driver's operation component. As noted above, when the component such as the vehicle vibration that is not derived from the driver's motion is contained in the detection value, the component also influences the band of the driver's operation component, leading to the prevention of an accurate evaluation of the driving skill.

The driver's driving skill is evaluated in terms of two types of performance, the vehicle stability and the turning performance. In addition to this, an overall characteristic for a composite performance of the above is also evaluated.

The vehicle stability evaluation unit 44 receives the detection values of the two-wheeled motor vehicle 1 in the turning motion interval Y to which the filtering is performed with the low-pass filter and the band-pass filter of the component separating unit 43. Hereafter, the case of inputting a yaw rate, a roll rate, and a pitch rate is to be described as one example.

The low frequency band components of the rates separated at the threshold frequency Fc1 are each interpreted as a prediction component when the driver turns a curve. Moreover, the first high frequency band component is interpreted as a modified component that the driver modifies upon turning the curve. Then, an average value of integral values of the prediction component and the modified component in a unit time in the turning interval Y is calculated for the yaw rate, the roll rate, and the pitch rate. The obtained values corresponding to the prediction components are each divided by a value corresponding to the modified component to be used as stability indices ($S_{yaw}$, $S_{roll}$, $S_{pitch}$) for the yaw rate, the roll rate, and the pitch rate in one turning interval Y. The stability indices are each a parameter of evaluation of the vehicle stability.

When the driver smoothly travels through the curve, an integral value of the absolute value for the low frequency band becomes large, and an integral value of the absolute value for the first high frequency band becomes small. When the driver performs minute and rapid control during travelling through the curve, the integral value of the absolute value for the first high frequency band becomes large, and the integral value of the absolute value for the low frequency band becomes small. As noted above, a ratio of the integral value of the absolute value for the low frequency band relative to the integral value of the absolute value for the first high frequency band is used as an index. This allows scoring of the driver's performance during travelling through curves.

The ratio in integral value of the absolute value for the low frequency band and the first high frequency band for the yaw rate, the roll rate, and the pitch rate of the two-wheeled motor vehicle 1 during the turning motion is calculated in the above manner. This allows calculation of the vehicle stability index of the two-wheeled motor vehicle 1. In addition, a vehicle stability score $S_v$ is calculated as a weighted linear sum of the three stability indices ($S_{yaw}$, $S_{roll}$, and $S_{pitch}$). The calculated vehicle stability score $S_v$ is outputted to the skill evaluation modifying unit 48.

The turning performance evaluation unit 45 receives the detection value of the two-wheeled motor vehicle 1 in the turning motion interval Y to which the component separating unit 43 performs the filtering with the low-pass filter. Hereinafter, the case of inputting the roll angle and the pitch angle is to be described as one example.

A low frequency band for the various types of the angles is interpreted as a prediction component when the driver turns during the curve. When the driver travels through the curve smoothly, the absolute values of the low frequency band become large. The threshold frequency Fc1 used to separate the frequency for the rates may be variable depending on the various types of the angles. The average value of the integral value of the prediction component in a unit time in the turning interval Y is calculated for the roll angle and the pitch angle, respectively. It is assumed that the calculated values are turning performance indices $T_{roll}$ and $T_{pitch}$ for the roll angle and the pitch angle, respectively. The turning performance indices are each a parameter to evaluate the turning performance. A weighted linear sum of these two turning performance indices is calculated as a turning performance score $T_v$. The turning performance score $T_v$ is outputted to the skill evaluation modifying unit 48.

The component amount detector 46 includes an all component amount detector 51 and a non-driver's operation component amount detector 52.

The all component amount detector 51 calculates an integration amount of all frequency band components for the roll rate in one turning interval Y. The calculated amount of components in all frequency bands is outputted to a ratio calculating unit 56 of the modification determining unit 47.

The non-driver's operation component amount detector 52 calculates an integration amount of the second high frequency band component for the roll rate during the one turning interval Y. The calculated amount of the second high frequency component is outputted to a ratio calculating unit 56 of the modification determining unit 47.

The modification determining unit 47 includes a ratio calculating unit 56 and a comparing unit 57. The modification determining unit 47 estimates a mixing ratio of noise to determine whether or not the evaluation result of the vehicle stability and the turning performance are to be modified.

The ratio calculating unit 56 calculates a ratio of the amount of components in all frequency bands detected with the component amount detector 51 and the amount of the second high frequency component detected with the non-driver's operation component amount detector 52. That is, the amount of the second high frequency component is divided by the amount of all frequency components. The ratio is a basis to estimate a ratio of noise components in the driver's operation components. A large ratio reveals estimation of a large ratio of noise component in the driver's operation components. The calculated ratio is outputted to the comparing unit 57.

The comparing unit 57 compares the ratio to be received and a threshold set in advance. If the ratio exceeds the threshold, it is determined that a ratio of the noise component in the driver's operation components is large. Accordingly, a modification instruction is issued to the skill evaluation modifying unit 48 to correct the vehicle stability score $S_v$ and the turning performance score $T_v$. If the ratio is less than the threshold, it is determined that a ratio of the noise components in the driver's operation components is small. In this case, no modification instruction is issued to the skill evaluation modifying unit 48. As a result, the vehicle stability score $S_v$ and the turning performance score $T_v$ are defined and used directly.

The skill evaluation modifying unit 48 modifies the vehicle stability score $S_v$ and the turning performance score $T_v$ in accordance with the determination results by the modification determining unit 47. Examples of the modification include three types of approaches, i.e., correction, abandon, and combination of correction and abandon.

Figure 6:
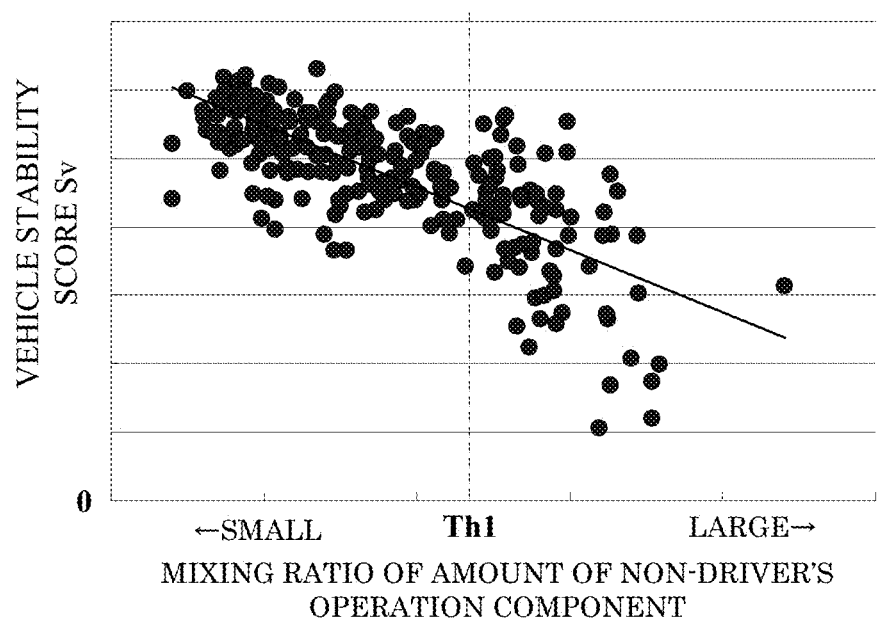
FIG. 6 is a graph illustrating a relationship between vehicle stability and a mixing ratio of noise according to the first preferred embodiment of the present invention.
Figure 7:
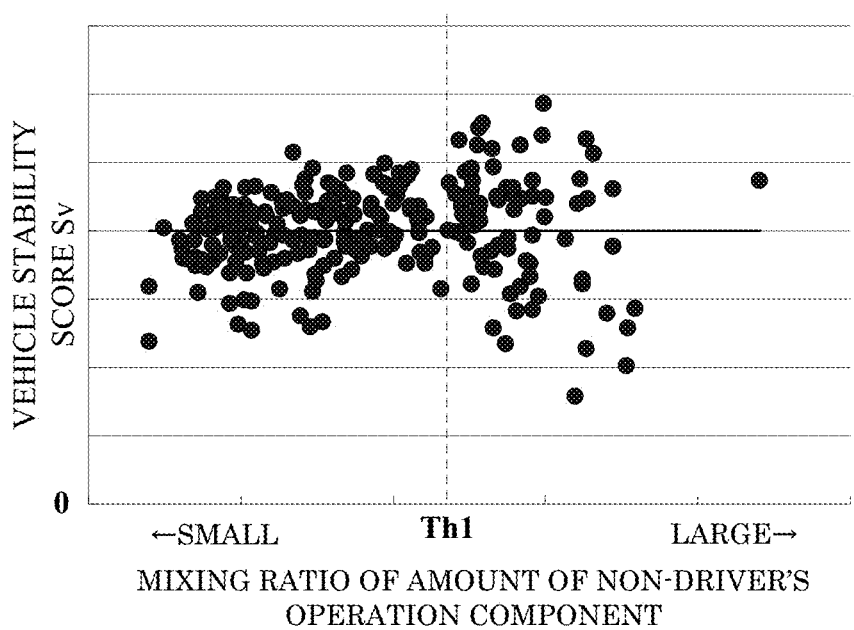
FIG. 7 is a graph illustrating a relationship between vehicle stability and a mixing ratio of noise subjected to correction according to the first preferred embodiment of the present invention.

The following describes a correcting approach of the vehicle stability score $S_v$ with reference to FIGS. 6 and 7. A certain relationship exists between the driving skill and the mixing ratio of the non-driver's operation component. For instance, a linear relationship is found between the vehicle stability and the mixing ratio of the non-driver's operation component (see FIG. 6). Accordingly, a relational expression is calculated in advance to use as a reference line, and the evaluated vehicle stability score $S_v$ is corrected in accordance with a distance from the reference line. FIG. 7 illustrates the correction results of the dots in FIG. 6. Similarly, the turning performance score $T_v$ is corrected based on another relational expression determined in advance.

It is shown in FIG. 6 that the vehicle stability score $S_v$ is significantly influenced as the mixing ratio increases. Accordingly, the threshold Th1 (e.g., 0.4 (40%)) is set in advance for an index of the mixing ratio of the non-driver's operation component amount. When the ratio calculated by the ratio calculating unit 56 exceeds the threshold Th1, it is determined that skill determination for the evaluated vehicle stability score $S_v$ has a low reliability, and the determination result is preferably abandoned. Moreover, when the ratio calculated by the ratio calculating unit 56 is equal to or less than the threshold Th1, the correction described above is performed. Here, the comparing unit 57 performs a determination with respect the threshold Th1.

Moreover, when the modification determining unit 47 issues a modification instruction, the skill evaluation modifying unit 48 may abandon the evaluated vehicle stability score $S_v$. This prevents an erroneous evaluation about the driver's vehicle stability and the driving performance.

As noted above, the skill evaluation modifying unit 48 may select the above three types of correction methods depending on a specification of the CPU and the like.

The overall characteristic evaluation unit 49 calculates a weighted linear sum of the vehicle stability score $S_v$ and the turning performance score $T_v$ to obtain a driver's overall characteristic score G during the turning interval Y. The overall characteristic score G is obtained by evaluating the driver's performance overall based on the driver's vehicle stability and the turning performance. The calculated overall characteristic score G is outputted to the skill determining unit 50 and the display 31. Then, the driver's driving skill is evaluated from the three indices of the overall characteristic score G, the vehicle stability score $S_v$, and the turning performance score $T_v$.

The skill determining unit 50 determines whether or not the vehicle stability score $S_v$, the turning performance score $T_v$, and the overall characteristic score G from the vehicle stability evaluation unit 44, the turning performance evaluation unit 45, and the overall characteristic evaluation unit 49, respectively, are each "high", "middle", or "low" relative to a pre-set threshold. The threshold as a criterion may have appropriate values optionally for use depending on the different performances. The display 31 receives and displays the determination results. The skill determining unit 50 inputs the corrected vehicle stability score $S_v$ and the turning performance score $T_v$ from the skill evaluation modifying unit 48 for use in determining the performance.

The driving skill evaluation result and the driving skill determining results are not only displayed on the display 31, but may be notified from the speaker 32 provided in the mobile terminal to the driver. Moreover, the driving skill evaluation result and the driving skill determining results may be notified from the speaker 34 provided in the helmet 38 to the driver via radio communication between the radio communication device 39 of the mobile terminal and the radio communication device 40 of the helmet 38.

Figure 8:
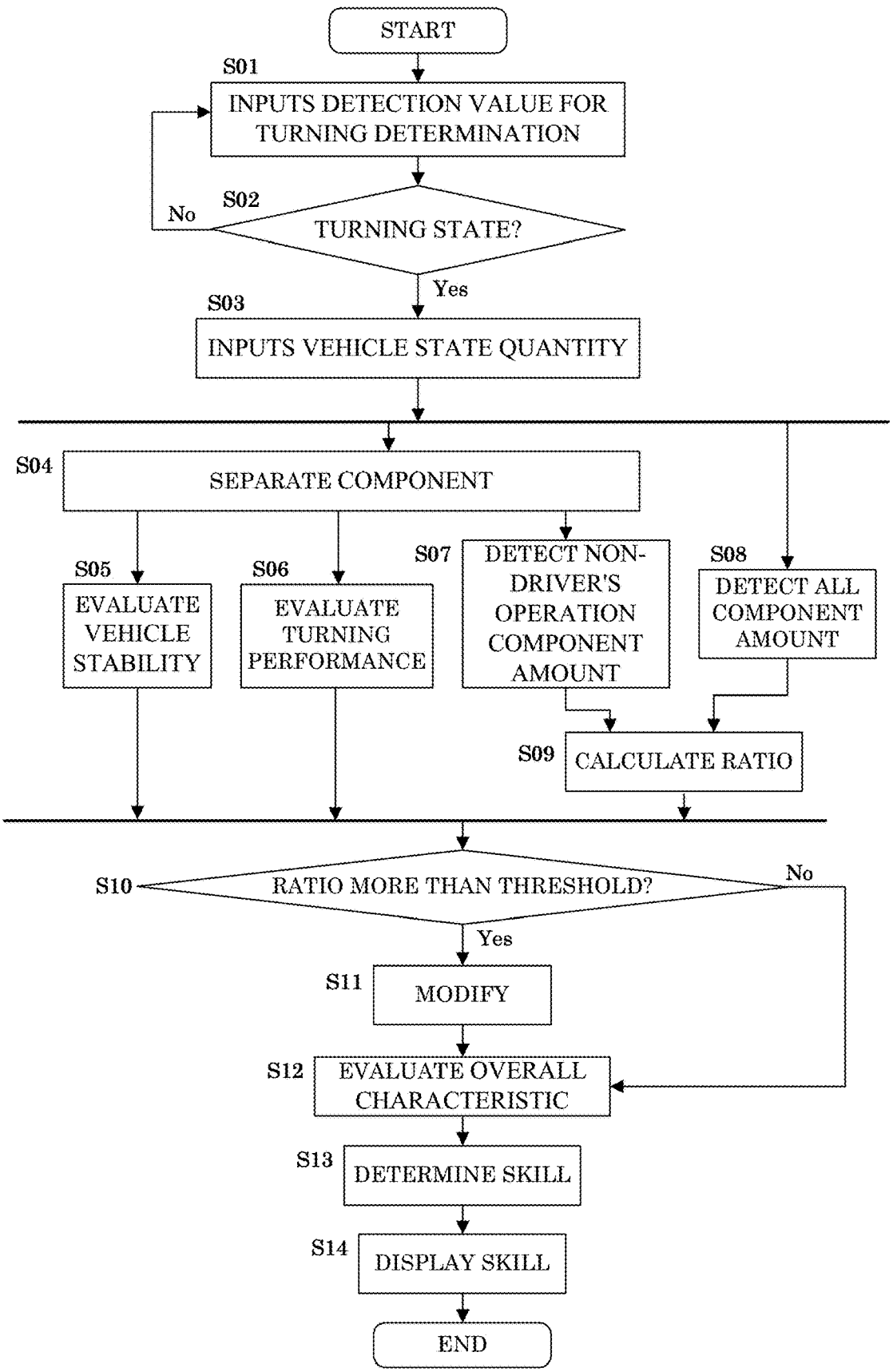
FIG. 8 is a flow chart illustrating a procedure of evaluating the driving skill according to the first preferred embodiment of the present invention.

The following describes a modification of the skill evaluation with reference to FIG. 8. FIG. 8 is a flow chart illustrating a procedure of modifying the skill evaluation.

While a power source is supplied to the mobile terminal including a function as the driving skill evaluation apparatus 28, the CPU always performs the turning determination. The turning determining unit 42 inputs a detection value for the turning determination from the attitude angle sensor 33 at any time (step S01). The turning determining unit 42 determines whether or not the two-wheeled motor vehicle 1 is in a turning state (step S02). The detection value for the turning determination corresponds to a detection value by the attitude angle sensor 33. Alternatively, a detection value by the GPS 35 may be used. When the turning determining unit 42 determines that the two-wheeled motor vehicle 1 is in the turning state (YES in the step S02), the memory 41 inputs a vehicle state quantity to the component separating unit 43 (step S03). When the turning determining unit 42 determines that two-wheeled motor vehicle 1 is not in the turning state (No in the step S02), the detection value for the turning determination is again inputted (step S01).

Next, filtering is performed to every vehicle state quantity, and components thereof are separated depending on the frequency characteristic (step S04). That is, the vehicle state quantity inputted to the component separating unit 43 is separated into the low frequency component, the first high frequency component, and the second high frequency components with the low-pass filter, the band-pass filter, and the high-pass filter, respectively.

The vehicle stability evaluation unit 44 calculates a vehicle stability score $S_v$ in accordance with the vehicle state quantity subjected to the filtering (step S05). Moreover, the turning performance evaluation unit 45 calculates a turning performance score $T_v$ in accordance with the vehicle state quantity subjected to the filtering (step S06).

Moreover, the non-driver's operation component amount detector 52 calculates an amount of the second high frequency components in one turning interval Y in accordance with the vehicle state quantity subjected to the filtering (step S07). Simultaneously with the steps S04 to S07, the all component amount detector 51 calculates an amount of all frequency components of the vehicle state quantity in the one turning interval Y (step S08).

Thereafter, the ratio calculating unit 56 calculates a ratio of an amount of all the components and the amount of the non-driver's operation component (step S09). Then, comparison is made between the threshold set in advance and the calculated ratio of the amount of all the components and the amount of the non-driver's operation component, so that it is determined whether or not the evaluated score is to be modified (step S10). If the ratio of the amount of all the components and the amount of the non-driver's operation component is a threshold or more (Yes in the step S10), it is determined that modification is needed, and accordingly a modification instruction is issued. If the ratio of the amount of all the components and the amount of the non-driver's operation component is less than the threshold (No in the step S10), it is determined that no modification is needed, and accordingly the obtained performance evaluation is defined.

When receiving the modification instruction, the skill evaluation modifying unit 48 modifies the calculated vehicle stability score $S_v$ and the turning performance score $T_v$ (step S11). The modified or defined vehicle stability score $S_v$ and the turning performance score $T_v$ are used to evaluate an overall characteristic G (step S12). Then, skill determination is performed through comparison between the modified or defined skill evaluation of the vehicle stability, the turning performance, and the overall characteristic and the threshold set in advance in correspondence thereto (step S13). The evaluated evaluation result and the skill determination result are displayed on the display 31 (step S14). As noted above, a driver's driving skill in one turning interval Y is evaluated.

The mobile terminal CPU evaluates the driving skill with a program that operates the mobile terminal CPU to function as the turning determining unit 42, the component separating unit 43, the vehicle stability evaluation unit 44, the turning performance evaluation unit 45, the component amount detector 46, the modification determining unit 47, the skill evaluation modifying unit 48, the overall characteristic evaluation unit 49, and the skill determining unit 50. The program may be stored in advance in the memory 41. Alternatively, the program may be downloaded from a host computer or a server by the radio communication device 39.

As noted above, the driving skill evaluation method, the non-transitory computer-readable medium including the driving skill evaluation program, and the driving skill evaluation apparatus according to the first preferred embodiment of the present invention prevents erroneous evaluation of the driver's driving skill even when the detection value by the attitude angle sensor 33 contains many components that are not derived from the driver's motion. Moreover, the component that is not derived from the driver's motion is separated based on the difference in their frequency band that is influenced by the driver's operation, leading to accurate detection of a component that is not derived from the driver's motion. In addition, using the ratio of all frequency bands allows detection of the component that is not derived from the driver's motion regardless of a range of the driver's motion.

Moreover, when the detection value by the attitude angle sensor 33 contains many components that are not derived from the driver's motion, it is determined that the driving evaluation result using the detection value is an evaluation result with low reliability and thus the evaluation result is preferably abandoned. This prevents erroneous determination of the driving skill.

Second Preferred Embodiment

Figure 9:
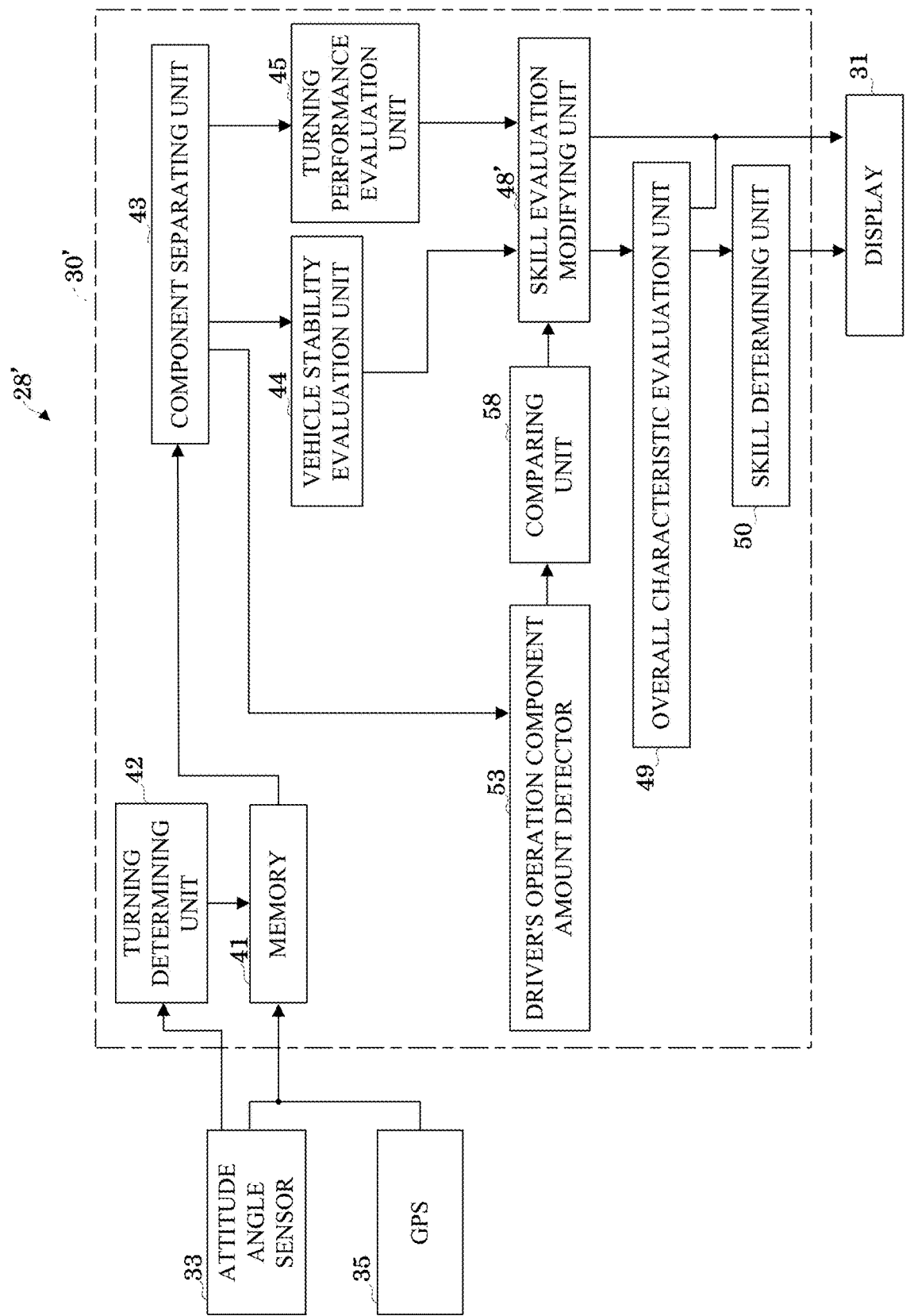
FIG. 9 is a functional block diagram of a driving skill evaluation apparatus according to a second preferred embodiment of the present invention.

The following describes a driving skill evaluation apparatus according to the second preferred embodiment of the present invention with reference to FIG. 9. In the first preferred embodiment, a ratio of noise in the amount of the driver's operation component is estimated from the ratio between the amount of the non-driver's operation component and the amount of all the components to modify the driving skill evaluation. In contrast to this, in the second preferred embodiment, a ratio of noise in the amount of the driver's operation component is estimated from a range of the driver's operation component to modify the driving skill evaluation.

FIG. 9 is a block diagram illustrating a driving skill evaluation apparatus according to the second preferred embodiment. In FIG. 9, since the elements with the same numerals as in the first preferred embodiment each preferably have the same configuration as in the first preferred embodiment, description thereof is omitted. The first preferred embodiment discloses a feature to determine whether or not the skill evaluation is modified with a ratio of the amount of the non-driver's operation component and the amount of all components. In contrast to this, the second preferred embodiment discloses a feature to determine whether or not the skill evaluation is modified with an amount of the driver's operation component. As a result, the configurations of the driving skill evaluation apparatus and the two-wheeled motor vehicle other than described below are preferably the same as those in the first preferred embodiment.

The second preferred embodiment includes a characteristic to determine whether or not the skill evaluation is modified based on the amount of the driver's operation component. The following describes a method of modifying the skill evaluation in the second preferred embodiment with reference to FIG. 10. A ratio of noise in the vehicle state quantity largely differs between when the driver's driving operation is large (D3) and when the driver's driving operation is small (D4). As for the detection value of the roll rate as one example, when the driver turns with inclining the two-wheeled motor vehicle 1 largely, the detection value of the roll rate increases. On the other hand, when the driver turns without inclining the two-wheeled motor vehicle 1 so largely, the detection value of the roll rate decreases. Here, D3 denotes the detection value of the roll rate in one turning interval when the driver turns and inclines the two-wheeled motor vehicle 1 largely. Moreover, D4 denotes the detection value of the roll rate in the turning interval when the driver turns without inclining the two-wheeled motor vehicle 1 so largely.

Figure 10:
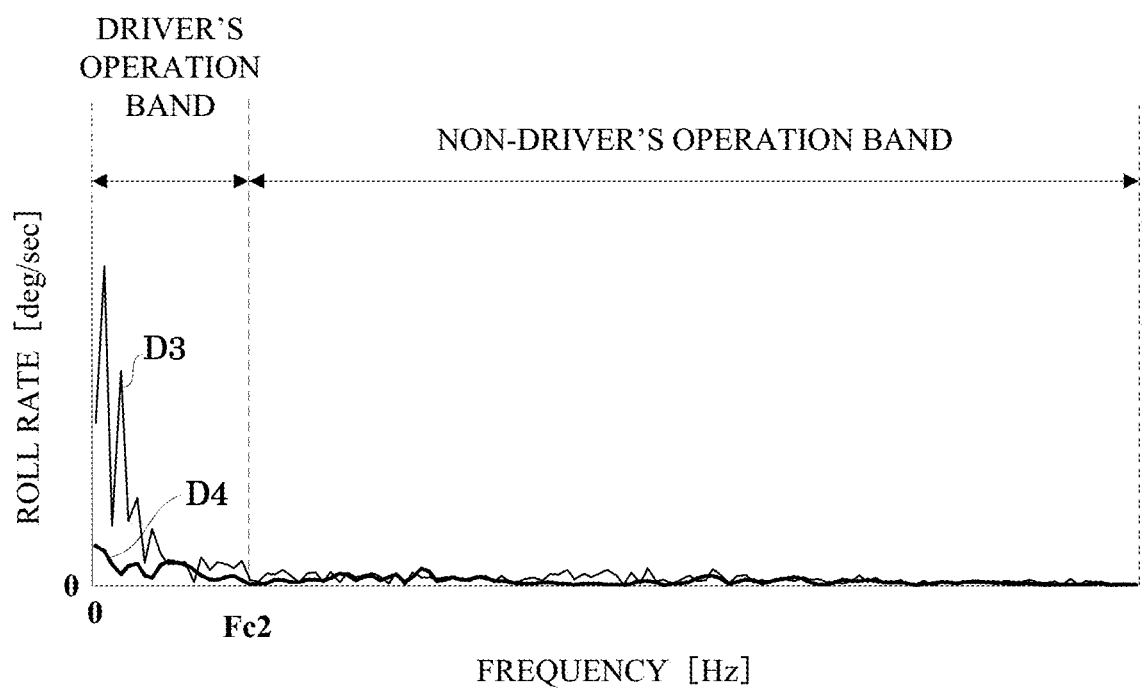
FIG. 10 is a graph illustrating a frequency spectrum of a roll rate according to the second preferred embodiment of the present invention.
Figure 11:
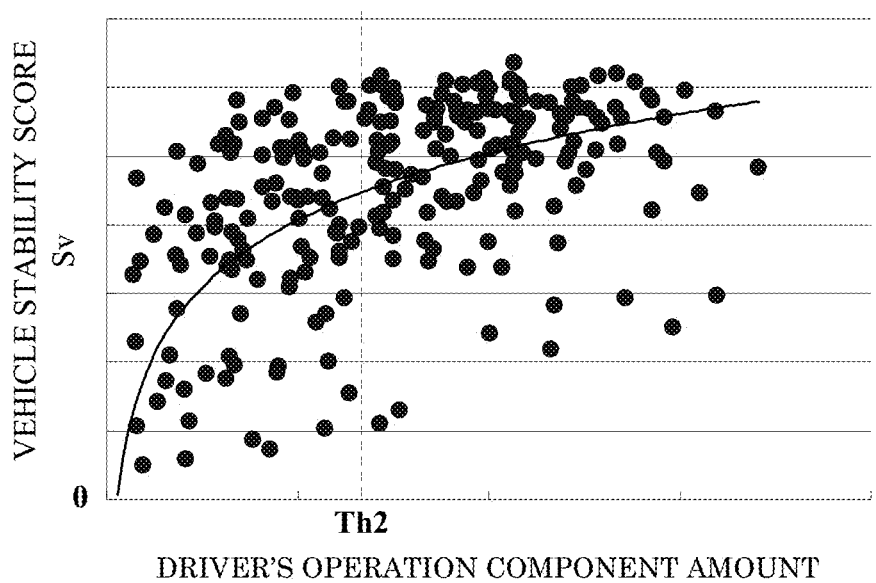
FIG. 11 is a graph illustrating a relationship between vehicle stability and a mixing ratio of noise according to the second preferred embodiment of the present invention.

As illustrated by D4 in FIG. 10, if the driver's vehicle operation is small, an amount of the driver's operation band component is small. Accordingly, the amount of the non-driver's operation band component in all frequency bands relatively increases. That is, a mixing ratio of the amount of the non-driver's operation component increases as the amount of the driver's operation band component decreases. FIG. 11 illustrates a tendency that the vehicle stability score $S_v$ becomes small as the amount of the driver's operation band component decreases.

As a result, a condition in which the amount of the driver's operation band component is small is interpreted as a condition in which the components that are not derived from the driver's motion make up the majority of the detection value of the vehicle state quantity. As noted above, the condition is determined that the component that is not derived from the driver's motion defines the majority of the components, correction is made in such a way to eliminate the above tendency between the amount of the driver's operation band component and the driving skill performance, or the evaluation result is abandoned.

As illustrated in FIG. 9, a driving skill evaluation apparatus 28' of the second preferred embodiment includes, instead of the component amount detector 46 and the modification determining unit 47 of the driving skill evaluation apparatus 28 in the first preferred embodiment, a driver's operation component amount detector 53 and a comparing unit 58.

The driver's operation component amount detector 53 calculates an integral of the low frequency band component during one turning interval and an integral of the first high frequency band component. Here, an amount of the low frequency component and an amount of the first high frequency component correspond to an amount of frequency components that is influenced by the driver's operation. Consequently, the amount of the low frequency component and the amount of the first frequency component is interpreted as an amount of the driver's operation component. The detected amount of the driver's operation component is transmitted to the comparing unit 58.

The comparing unit 58 compares the amount of the driver's operation component with a threshold set in advance. If the amount of the driver's operation component is more than the threshold, the evaluation result is defined with no modification. If the amount of the driver's operation component is equal to or less than the threshold, an instruction is issued to the skill evaluation modifying unit 48' to modify the evaluation result.

Figure 12:
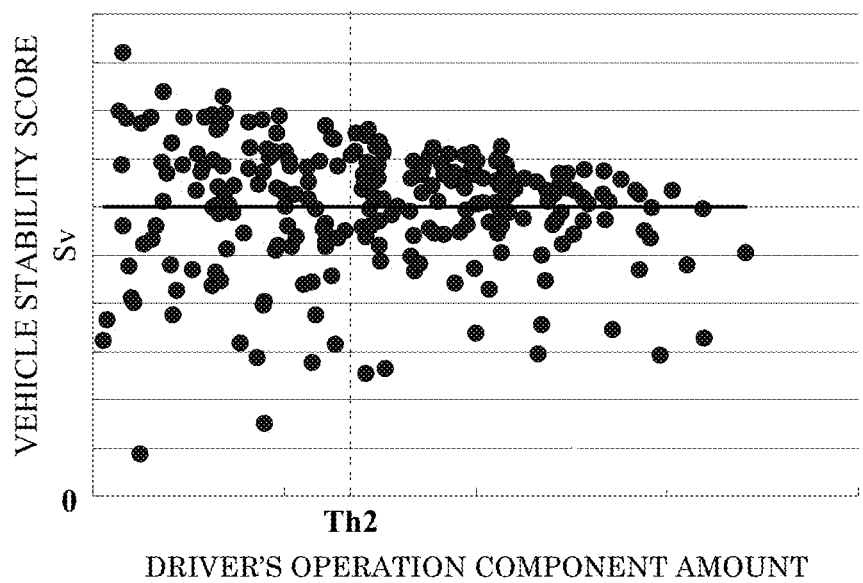
FIG. 12 is a graph illustrating a relationship between vehicle stability and a mixing ratio of noise subjected to correction according to the second preferred embodiment of the present invention.

The skill evaluation modifying unit 48' corrects a tendency by the amount of the driver's operation band component as illustrated in FIG. 11. The tendency is, for example, expressible by a relational expression with a natural logarithm. Here, a method of such correction is selectable from three types of methods in the same manner as in the first preferred embodiment. FIG. 12 illustrates corrected vehicle stability scores. As noted above, a relational expression between the amount of the driver's operation band component and the driving skill performance is calculated in advance, and correction is made based on the relational expression. This suppresses influence by the component, such as vehicle vibration, that is not derived from the driver's motion. If the amount of the driver's operation band component is less than a threshold Th2, it is shown that the vehicle stability is largely influenced. Accordingly, when the amount of the driver's operation band component is less than the threshold Th2, it is determined that skill determination of the evaluated vehicle stability score $S_v$ has a low reliability, and thus the determination result is abandoned. Here, the threshold Th2 is, for example, around 15. The corrected driving evaluation result is outputted to the overall characteristic evaluation unit 49 and the display 31.

Figure 13:
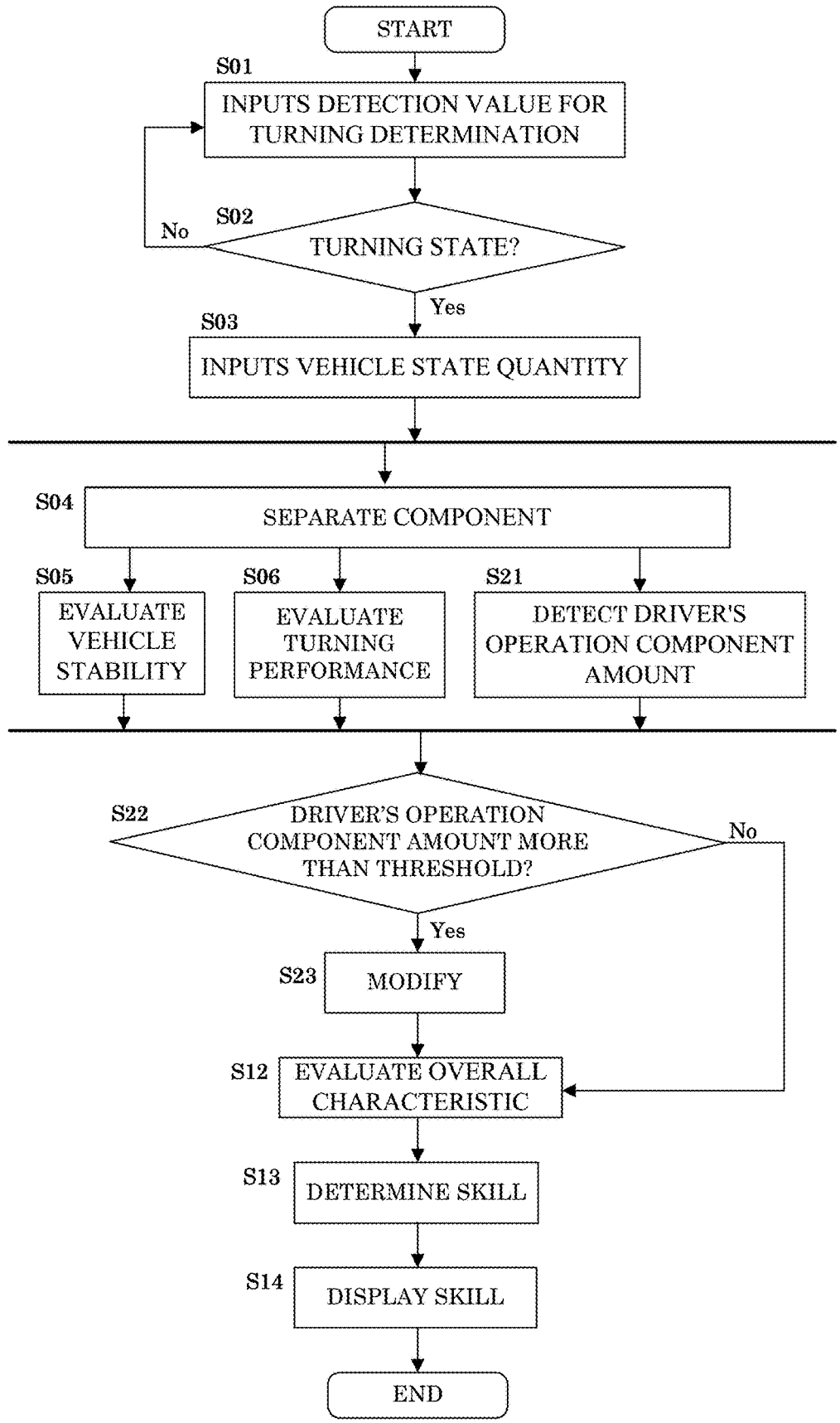
FIG. 13 is a flow chart illustrating a procedure of evaluating a driving skill according to the second preferred embodiment of the present invention.

The following describes a modification of the skill evaluation in the second preferred embodiment of the present invention with reference to FIG. 13. FIG. 13 is a flow chart illustrating a procedure of modifying the skill evaluation. Since steps S01 to S06 in the second preferred embodiment are preferably the same as those in the first preferred embodiment, description thereof is omitted.

An amount of the driver's operation band component in one turning interval Y separated through component separation is calculated (step S21). That is, an integral of the band components of the driver's operation is calculated in one turning interval. Then comparison is made between the calculated amount of the driver's operation component and a threshold set in advance, so that it is determined whether or not the evaluated vehicle stability score $S_v$ and the turning performance score $T_v$ is to be modified (step S22). If the amount of the driver's operation component is equal to or less than the threshold set in advance (Yes in the step S22), the comparing unit 58 determines the necessity of modification, and issues an instruction to modify to the skill evaluation modifying unit 48'. If the amount of the driver's operation component is more than the threshold set in advance (No in the step S22), it is determined that no modification is needed, and then the obtained performance evaluation is defined. When receiving the instruction to modify, the skill evaluation modifying unit 48' modifies the evaluated driving skill (step S23). The subsequent steps S12 to S14 are preferably the same as those in the first preferred embodiment, and thus description thereof is omitted.

The mobile terminal CPU evaluates the driving skill with the program that operates the mobile terminal CPU and functions as the turning determining unit 42, the component separating unit 43, the vehicle stability evaluation unit 44, the turning performance evaluation unit 45, the driver's operation component amount detector 53, the comparing unit 58, the skill evaluation modifying unit 48', the overall characteristic evaluation unit 49, and the skill determining unit 50. The program may be stored in advance in the memory 41. Alternatively, the program may be downloaded from a server by the radio communication device 39.

As noted above, the driving skill evaluation method, the non-transitory computer-readable medium including the driving skill evaluation program, and the driving skill evaluation apparatus in the second preferred embodiment allows estimation of a mixing ratio of noise in a simple manner. This enhances the reliability of the driving skill evaluation, and thus prevents an erroneous determination. Even when the component that is not derived from the driver's motion defines the majority of the detection value used in the driving skill evaluation, the evaluation result of the driving skill using the detection value is determined as one with a low reliability and thus is removed.

Third Preferred Embodiment

The following describes a driving skill evaluation apparatus according to a third preferred embodiment of the present invention.

The third preferred embodiment includes a combination of the correction of the driving evaluation in the first preferred embodiment and that in the second preferred embodiment. That is, a ratio of noise in the driver's operation component is estimated from a ratio of the non-driver's operation component and the amount of all components for correction of the driving evaluation. Moreover, a ratio of noise in the driver's operation component is estimated from an amount of the driver's operation component for correction of the driving evaluation.

Figure 14:
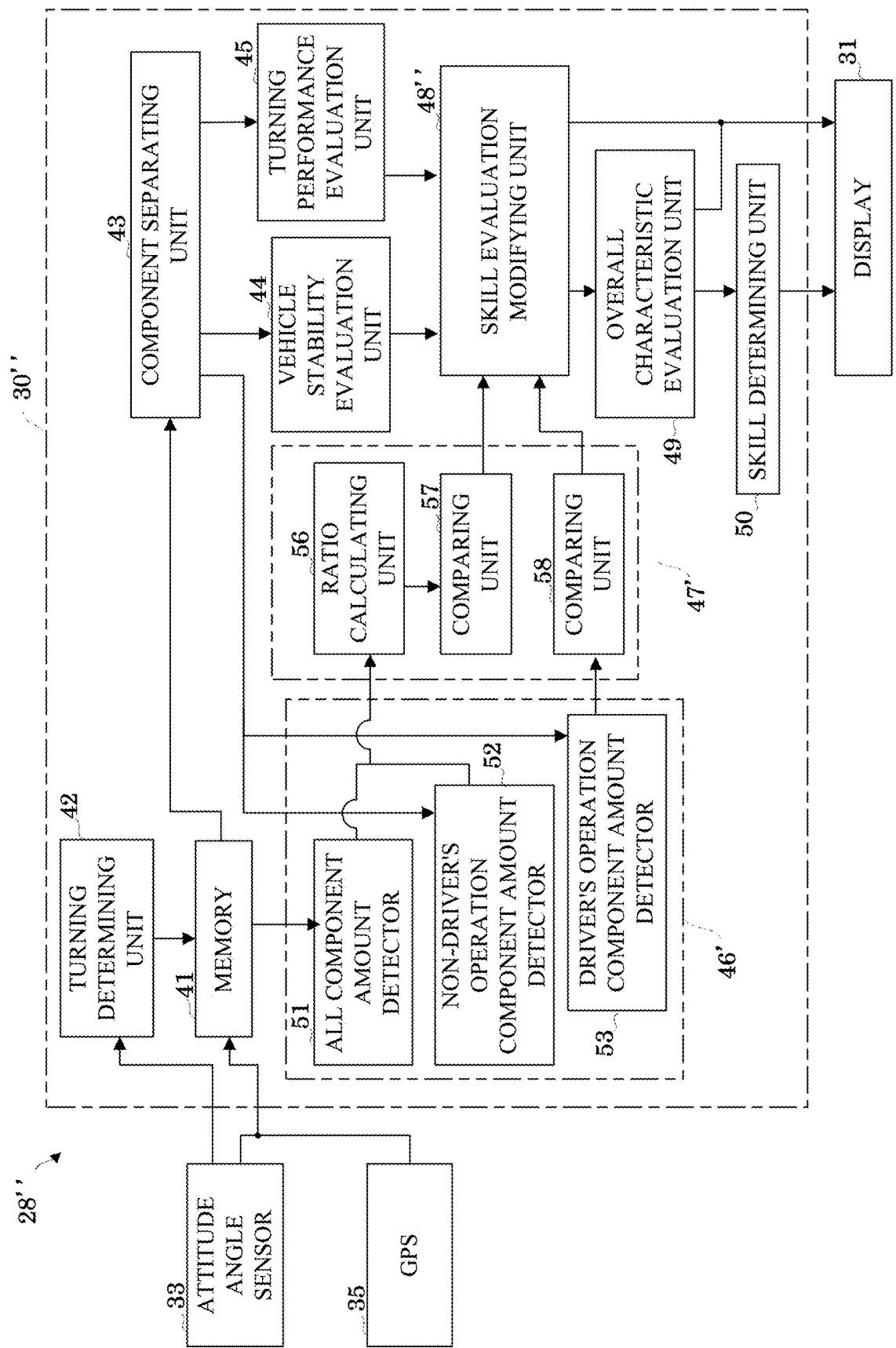
FIG. 14 is a functional block diagram illustrating a driving skill evaluation apparatus according to a third preferred embodiment of the present invention.

Reference is made to FIG. 14. FIG. 14 is a block diagram illustrating a driving skill evaluation apparatus of the third preferred embodiment. In FIG. 14, since the elements with the same numerals as in the first and second preferred embodiments each preferably have the same configuration as in the first and second preferred embodiments, description thereof is omitted. Consequently, the configurations of the driving skill evaluation apparatus and the two-wheeled motor vehicle other than that described below are preferably the same in as the first and second preferred embodiments.

A driving skill evaluation apparatus 28" in the third preferred embodiment includes a component amount detector 46' obtained by adding the driver's operation component amount detector 53 in the second preferred embodiment to the component amount detector 46 of the driving skill evaluation apparatus 28 in the first preferred embodiment, and a modification determining unit 47' obtained by adding the comparing unit 58 in the second preferred embodiment to the modification determining unit 47 in the first preferred embodiment. The skill evaluation modifying unit 48" in the third preferred embodiment 3 also includes both functions as the skill evaluation modifying unit 48 in the first preferred embodiment and the skill evaluation modifying unit 48' in the second preferred embodiment.

Figure 15:
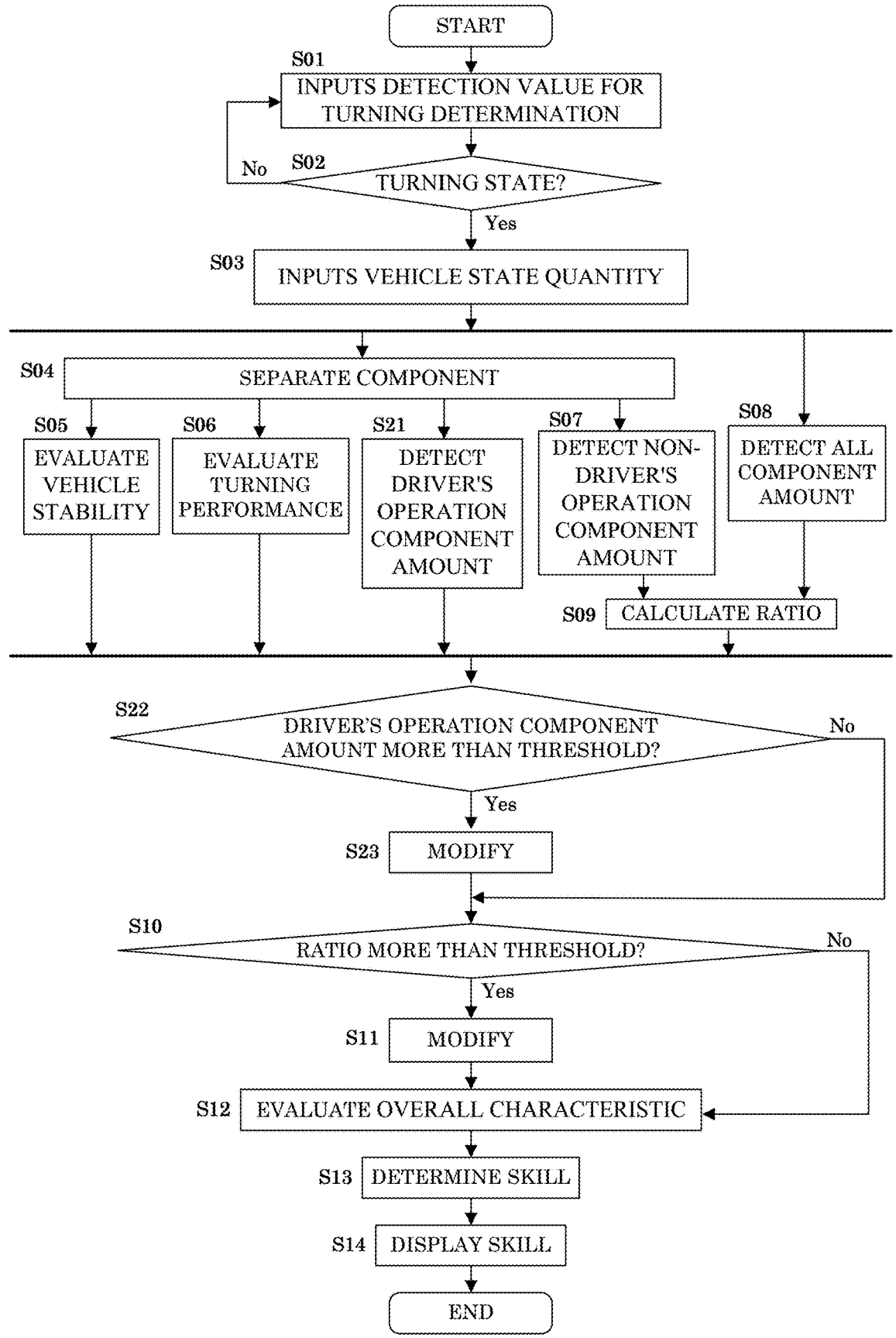
FIG. 15 is a flow chart illustrating a procedure of evaluating a driving skill according to a preferred embodiment of the present invention.

The following describes a modification of the skill evaluation in the third preferred embodiment with reference to FIG. 15. FIG. 15 is a flow chart illustrating a procedure of modifying the skill evaluation. Since steps S01 to S09 and step S21 in the third preferred embodiment are preferably the same as those in the first and second preferred embodiments, description thereof is omitted. In the step S22, comparison is made between the calculated amount of the driver's operation component and a threshold set in advance in the same manner as in the second preferred embodiment, so that it is determined whether or not the evaluated vehicle stability score $S_v$ and the turning performance score $T_v$ are to be modified. If the amount of the driver's operation component is equal to or less than the threshold set in advance (Yes in the step S22), the comparing unit 58 determines the necessity for modification, and issues a modification instruction to the skill evaluation modifying unit 48". If the amount of the driver's operation component is more than the threshold set in advance (No in the step S22), it is determined that no modification is needed, and the process proceeds to the step S10. When receiving the modification instruction, the skill evaluation modifying unit 48" modifies the evaluated driving skill (step S23).

Moreover, similar to the first preferred embodiment, comparison is made between the calculated ratio of the amount of all components and the amount of the non-driver's operation component and the threshold set in advance, so that it is determined whether or not the evaluated vehicle stability score $S_v$ and the turning performance score $T_v$ are to be modified (step S10). If the ratio of the amount of all components and the amount of the non-driver's operation component is equal to or more than the threshold (Yes in the step S10), the comparing unit 57 determines the necessity for modification, and accordingly a modification instruction is issued to the skill evaluation modifying unit 48". If the ratio of the amount of all components and the amount of the non-driver's operation component is less than the threshold (No in the step S10), it is determined that no modification is needed, and accordingly the obtained performance evaluation is defined. When receiving the modification instruction, the skill evaluation modifying unit 48" modifies the calculated vehicle stability score $S_v$ and the turning performance score $T_v$ (step S11). The subsequent steps S12 to S14 are preferably the same as those in the first preferred embodiment, and thus description thereof is to be omitted.

The mobile terminal CPU evaluates the driving skill with the program that operates the mobile terminal CPU and functions as the turning determining unit 42, the component separating unit 43, the vehicle stability evaluation unit 44, the turning performance evaluation unit 45, the component amount detector 46', the modification determining unit 47', the skill evaluation modifying unit 48", the overall characteristic evaluation unit 49, and the skill determining unit 50. The program may be stored in advance in the memory 41. Alternatively, the program may be downloaded from a server by the radio communication device 39.

As noted above, the driving skill evaluation method, the non-transitory computer-readable medium including the driving skill evaluation program, and the driving skill evaluation apparatus in the third preferred embodiment allow estimation of a mixing ratio of noise using two methods. This enhances the reliability of the driving skill evaluation, and thus prevents an erroneous determination.

Preferred embodiments of the present invention are not limited to the above described preferred embodiments, but may be modified as described below.

In the above-described preferred embodiments, the attitude angle sensor 33 preferably detects the yaw angle, the yaw rate, the roll angle, the roll rate, the pitch angle, and the pitch rate as a vehicle state quantity. However, this is not limitative. Instead of the detection value representing these vehicle states, a detection value representing a vehicle state such as a caster angle, a steering angle, or a vehicle speed may be obtained. Moreover, a throttle operating quantity may be detected. Moreover, any detection value of the above vehicle state quantity may be detected as a vehicle state quantity.

Figure 16:
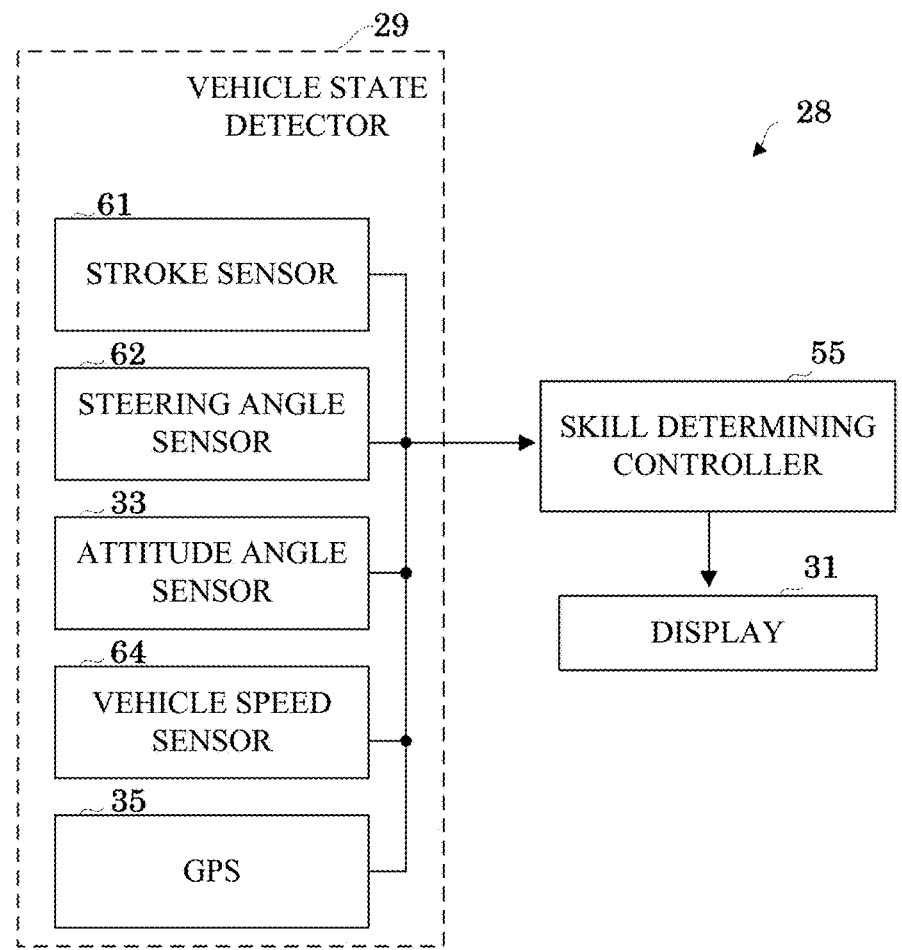
FIG. 16 is a functional block diagram illustrating a driving skill evaluation apparatus according to a modified preferred embodiment of the present invention.

Reference is made to FIG. 16. FIG. 16 is a functional block diagram of the driving skill evaluation apparatus according to a modification of the preferred embodiments of the present invention. The driving skill evaluation apparatus 28 may include a vehicle state detector 29 which includes a stroke sensor 61, a steering angle sensor 62, and a vehicle speed sensor 64 besides the attitude angle sensor 33. Providing many vehicle state detectors as above allows more accurate evaluation of the driver's driving skill.

Figure 17:
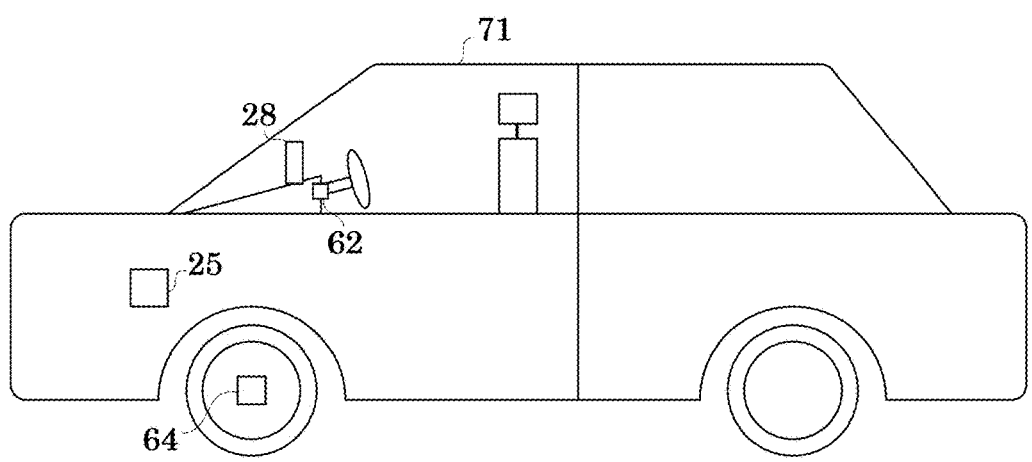
FIG. 17 is a side view illustrating an outline construction of a four-wheeled motor vehicle according to the modified preferred embodiment of the present invention.

In the above-described preferred embodiments, the two-wheeled motor vehicle 1 has been described as one example of the vehicle. However, this is not limitative. Alternatively, as illustrated in FIG. 17, a four-wheeled motor vehicle 71 may be used. Moreover, the four-wheeled motor vehicle 71 is able to notify the driver of the driving skill evaluation result or the driving skill determination result from the speaker 32 embedded in the smartphone.

In the above-described preferred embodiments, the driving skill to be evaluated is preferably the turning performance, the vehicle stability, and the overall characteristic. However, this is not limitative. Besides, the driving skill to be evaluated may be an evaluated braking performance. When the braking performance is evaluated, it is preferred that the state quantity detector 29 includes a brake pressure sensor.

In the above-described preferred embodiments, a plurality of types of vehicle state quantities is detected to evaluate the driving skill. However, the driving skill may be evaluated from at least one vehicle state quantity. For instance, only the roll rate is detected as the vehicle state quantity to evaluate the driving skill.

In the above-described preferred embodiments, the mobile terminal is used as the driving skill evaluation apparatus. However, this is not limitative. The driving skill evaluation apparatus provided with the vehicle such as the two-wheeled motor vehicle 1 and the four-wheeled motor vehicle 71 may be used. For instance, an ECU 25 may be used as the skill determining controller 30. In addition, the attitude angle sensor 33 may be attached to the vehicle.

In the first and third preferred embodiments described above, a ratio of noise in the driver's operation component is estimated from a ratio of the amount of all frequency components and the amount of the second high frequency component. However, this is not limitative. A ratio of the amount of the second high frequency component and the amount of the driver's operation component, the amount of the low frequency component, and the amount of the first high frequency component may be used instead of a ratio of the amount of the second high frequency component and the amount of all frequency components. That is, it may be determined whether or not the performance evaluation is modified based on a ratio of the amount of the second high frequency component and the amount of the low frequency component or a ratio of the amount of the second high frequency component and the amount of the first high frequency component.

In the second and third preferred embodiments described above, it is determined whether or not the performance evaluation is modified depending on an amount of the driver's operation component. However, this is not limitative. It may be determined whether or not the performance evaluation is modified depending on the amount of the low frequency component or the amount of the first high frequency component as a part of the amount of the driver's operation component.

In the above-described preferred embodiments, the evaluation result of the driving skill is preferably modified. Alternatively, the driving skill evaluation may be modified through correction of a parameter for the driving skill evaluation. That is, a skill evaluation modifying unit 48 may be provided inside the vehicle stability evaluation unit 44 and the turning performance evaluation unit 45.

The following describes an evaluation parameter of the vehicle stability as one example. Three stability indices ($S_{yaw}$, $S_{roll}$, $S_{pitch}$) are corrected based on the components that are not derived from the driver's motion using any of the methods in the first through third preferred embodiments. That is, the index $S_{yaw}$ is corrected based on a component of the yaw rate that is not derived from the driver's motion. The $S_{roll}$ is corrected based on a component of the roll rate that is not derived from the driver's motion. The $S_{pitch}$ is corrected based on a component of the pitch rate that is not derived from the driver's motion. The vehicle stability score $S_v$ is each calculated from these corrected stability indices, so that an accurate evaluation of the driving skill is obtained.

When at least one of the three stability indices is abandoned based on the component that is not derived from the driver's motion, no vehicle stability score $S_v$ is calculated to prevent an erroneous evaluation of the driver's driving skill. The driving skill of the vehicle stability may be evaluated with the stability index that is not abandoned among the three stability indices. Moreover, the above modification method is applicable not only to the vehicle stability but also to another skill performance evaluation. As noted above, the modification of the driving skill evaluation may be a modification of the evaluation result of the driving skill or a modification of the evaluation parameter used for the driving skill evaluation.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A method of evaluating a driving skill of a driver executed by a computer, the method comprising:
    a skill evaluation step of evaluating the driving skill based on a detection value of a vehicle state detected by a vehicle state detector;
    a component separating step of separating the detection value of the vehicle state detected by the vehicle state detector into a driver's operation component reflecting a driver's motion and a non-driver's operation component without reflecting the driver's motion; and
    a skill evaluation modifying step of correcting or abandoning an evaluation of the driving skill based on at least one of an amount of the driver's operation component and an amount of the non-driver's operation component.

2. The method of evaluating the driving skill according to claim 1, the method further comprising:
    a non-driver's operation component amount detecting step of detecting the amount of the non-driver's operation component; and
    an all component amount detecting step of detecting an amount of all components in the detection value of the vehicle state; wherein
    in the component separating step, a high frequency component higher than a threshold frequency set in advance is extracted from the detection value of the vehicle state as the non-driver's operation component; and
    in the skill evaluation modifying step, the evaluation of the driving skill is corrected or abandoned based on a ratio of the amount of the non-driver's operation component and the amount of all components in the detection value.

3. The method of evaluating the driving skill according to claim 1, the method further comprising:
- a driver's operation component amount detecting step of detecting the amount of the driver's operation component; wherein
- in the component separating step, a frequency component equal to or lower than a threshold frequency set in advance is extracted from the detection value of the vehicle state as the driver's operation component; and
- in the skill evaluation modifying step, the evaluation of the driving skill is corrected or abandoned based on the amount of the driver's operation component.

4. A non-transitory computer-readable medium including a program for evaluating a driving skill of a driver, the program causing a computer to function as:
- a skill evaluation unit that evaluates the driving skill based on a detection value of a vehicle state detected by a vehicle state detector;
- a component separating unit that separates the detection value of the vehicle state detected by the vehicle state detector into a driver's operation component reflecting a driver's motion and a non-driver's operation component without reflecting the driver's motion; and
- a skill evaluation modifying unit that corrects or abandons an evaluation of the driving skill based on at least one of an amount of the driver's operation component and an amount of the non-driver's operation component.

5. The non-transitory computer-readable medium according to claim 4, the program further causing the computer to function as:
- a non-driver's operation component amount detector that detects the amount of the non-driver's operation component; and
- an all component amount detector that detects an amount of all components in the detection value of the vehicle state; wherein
- the component separating unit extracts a high frequency component higher than a threshold frequency set in advance from the detection value of the vehicle state as the non-driver's operation component; and
- the skill evaluation modifying unit corrects or abandons the evaluation of the driving skill based on a ratio of the amount of the non-driver's operation component and the amount of all components in the detection value.

6. The non-transitory computer-readable medium according to claim 4, the program further causing the computer to function as:
- a driver's operation component amount detector that detects the amount of the driver's operation component; wherein
- the component separating unit extracts a frequency component equal to or lower than a threshold frequency set in advance from the detection value of the vehicle state as the driver's operation component; and
- the skill evaluation modifying unit corrects or abandons the evaluation of the driving skill based on the amount of the driver's operation component.

7. A driving skill evaluation apparatus comprising:
a controller configured or programmed to include:
- a skill evaluation unit that evaluates a driving skill of a driver based on a detection value of a vehicle state detected by a vehicle state detector;
- a component separating unit that separates the detection value of the vehicle state detected by the vehicle state detector into a driver's operation component reflecting a driver's motion and a non-driver's operation component without reflecting the driver's motion; and
- a skill evaluation modifying unit that corrects or abandons an evaluation of the driving skill based on at least one of an amount of the driver's operation component and an amount of the non-driver's operation component.

8. The driving skill evaluation apparatus according to claim 7, wherein the controller is further configured or programmed to include:
- a non-driver's operation component amount detector that detects the amount of the non-driver's operation component; and
- an all component amount detector that detects an amount of all components in the detection value of the vehicle state; wherein
- the component separating unit extracts a high frequency component higher than a threshold frequency set in advance from the detection value of the vehicle state as the non-driver's operation component; and
- the skill evaluation modifying unit corrects or abandons the evaluation of the driving skill based on a ratio of the amount of the non-driver's operation component and the amount of all components in the detection value.

9. The driving skill evaluation apparatus according to claim 7, wherein the controller is further configured or programmed to include:
- a driver's operation component amount detector that detects the amount of the driver's operation component; wherein
- the component separating unit extracts a frequency component equal to or lower than a threshold frequency set in advance from the detection value of the vehicle state as the driver's operation component; and
- the skill evaluation modifying unit corrects or abandons the evaluation of the driving skill based on the amount of the driver's operation component.

10. The driving skill evaluation apparatus according to claim 7, wherein the controller is further configured or programmed to include:
- an information notification unit that notifies a driver of information on the evaluation of the driving skill that is modified with the skill evaluation modifying unit.

11. A vehicle comprising the driving skill evaluation apparatus according to claim 7.

* * * * *